United States Patent
Lennen

(10) Patent No.: US 7,994,977 B2
(45) Date of Patent: Aug. 9, 2011

(54) METHOD AND APPARATUS FOR A GPS RECEIVER CAPABLE OR RECEPTION OF GPS SIGNALS AND BINARY OFFSET CARRIER SIGNALS

(75) Inventor: Gary Lennen, Cupertino, CA (US)

(73) Assignee: SiRF Technology Inc., San Jose, CA (US)

( * ) Notice: Subject to any disclaimer, the term of this patent is extended or adjusted under 35 U.S.C. 154(b) by 251 days.

(21) Appl. No.: 12/326,879

(22) Filed: Dec. 2, 2008

(65) Prior Publication Data

US 2010/0134354 A1 Jun. 3, 2010

(51) Int. Cl.
*G01S 19/37* (2010.01)
*G01S 19/33* (2010.01)

(52) U.S. Cl. ............................... 342/357.77; 342/357.73
(58) Field of Classification Search ............. 342/357.21, 342/357.26, 357.37, 357.46, 357.73, 357.77; 701/213, 215

See application file for complete search history.

(56) References Cited

U.S. PATENT DOCUMENTS 6,289,041 B1* 9/2001 Krasner ........................ 375/152
2010/0295727 A1* 11/2010 Duffett-Smith et al. . 342/357.77

* cited by examiner

*Primary Examiner* — Dao L Pham
(74) *Attorney, Agent, or Firm* — RatnerPrestia

(57) ABSTRACT

A system and method capable of mitigating the migration from the current GPS system to the Galileo system and allow a single satellite system positioning receiver to process both GPS signals and Galileo signals.

11 Claims, 11 Drawing Sheets

METHOD AND APPARATUS FOR A GPS RECEIVER CAPABLE OR RECEPTION OF GPS SIGNALS AND BINARY OFFSET CARRIER SIGNALS

BACKGROUND OF THE INVENTION

A new satellite positioning system is in the process of being developed and deployed. This new satellite positioning system is called Galileo and is different from the currently implemented GPS system found in North America. Current GPS system receivers are unable to decode and correlate the binary offset (BOC) carrier signals that will be generated by the Galileo systems and the next generation GPS system signals that will also employ the BOC carrier signals. The next generation GPS system is due for deployment after 2013.

But, the implementation of Galileo will most likely take many years. Currently four Galileo satellite vehicles are due to be in place by the end of 2010. The planned 30 Galileo satellite vehicles are not due to be fully deployed until some time after 2012. This creates a problem for consumers and manufactures who are investing in current GPS technology approaches. Consumers and manufactures currently have only two options when buying GPS receivers; 1) GPS receives that may be used only with the current GPS system; or 2) GPS receives that may be used only with the Galileo system.

Therefore, there is a need for systems and methods capable of mitigating the migration from the current GPS system to the Galileo system and allow a single satellite system positioning receiver to process both GPS signals and Galileo signals.

SUMMARY OF THE INVENTION

An apparatus and method are described that enables a currently implemented GPS receiver to be implemented to receive and correlate GPS system signals and Galileo BOC signals. This GPS Galileo receiver (GGR) may be based on a traditional GPS receiver with modification to support reception and decoding of Galileo signals. The traditional GPS receiver may be modified with a BOC generator and changes made to the input sample memory, coherent memory, non-coherent memory, and peak memory. When the GGR receives a traditional GPS signal, it functions in a GPS mode as a traditional GPS receiver. But, when in a Galileo mode the GRR uses a 16fo acquisition/track modes, employs a data Viterbi decoder capable of decoding wide area augmentation system (WAAS) signals, allocates coherent, non-coherent and other memory for Galileo channels, and reconfigures input sample memory and the controller for processing Galileo channels.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

DETAILED DESCRIPTION

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of this invention.

The present disclosure describes a GPS and Galileo receiver (GGR) that is capable of operating in two different modes. The first mode (i.e. GPS mode) is for reception and processing of traditional GPS positioning signal and the other mode (i.e. Galileo mode) if for reception and processing of Galileo BOC positioning signal. The two modes of operations share a number of common receiver elements.

Figure 1:
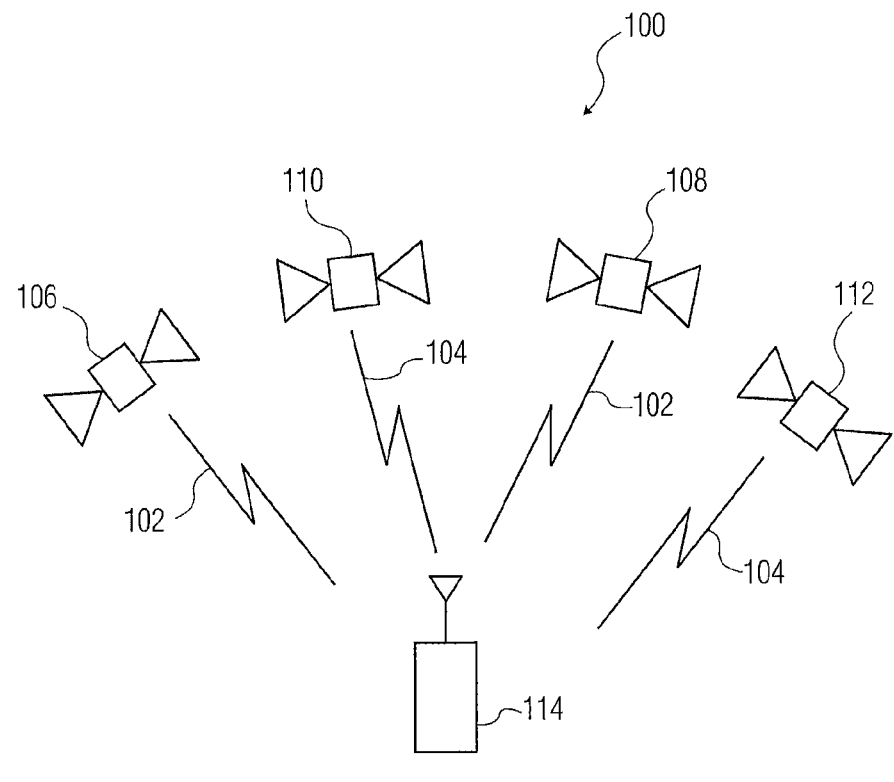
FIG. 1 illustrates a block diagram of an example of an implementation of a satellite positioning system in accordance with the invention.

In FIG. 1, a diagram 100 of a GPS satellite positioning system 102 and a Galileo satellite positioning system 104 is shown. Each of the satellite positioning systems 102 and 104 are made up of satellite vehicles (SV), for example, SV 106, SV 108, SV 110, and SV 112. SVs 106 and 108 may belong to a first satellite system, such as GPS satellite positioning system 102. Similarly, SVs 110 and 112 may belong to a second satellite positioning system, such as Galileo satellite positioning system 104. The two satellite positioning system 102 and 104 may both be received at a common GGR 114. The GGR 114 may be a standalone satellite positioning receiver or it may be integrated with another device, such as a cellular telephone, personal digital assistant (PDA), in-car entertainment center, AM/FM radio, or even a clock or a watch.

Figure 2:
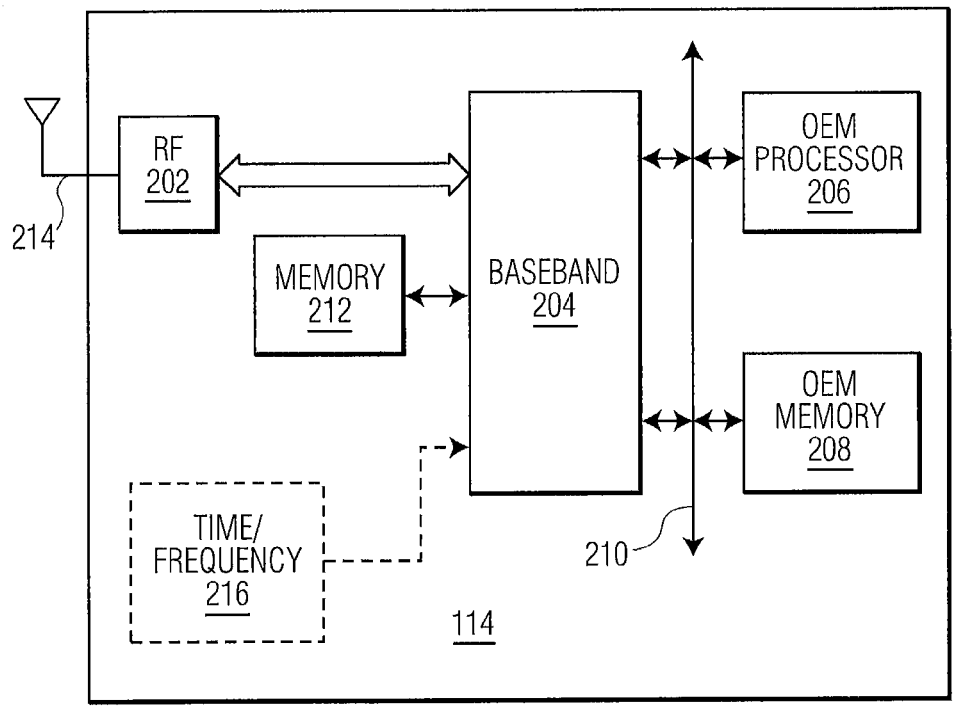
FIG. 2 illustrates a block diagram of an embodiment of a GPS receiver.

Turning to FIG. 2, a block diagram of an embodiment of a GGR 114, including a radio frequency ("RF") component 202 and a baseband component 204. In one embodiment, the RF component 202 and the baseband component 204 may interface with additional functionality provided by an original equipment manufacturer ("OEM") subsystem, or "host" processor 206 and OEM memory 208 over a bus 210. As will be described below, the baseband component 204 may communicate with a memory component 212. The memory component 212 may be separate from the baseband component 204. In other implementations the memory component 212 may be implemented within the baseband component 204. The RF component 202 may be directly coupled to an antenna 214 that is dedicated to the RF component 202. In other implementations, the antenna 214 may be shared by the RF component 202 and an OEM receiver (not shown). Optionally, the OEM memory 208 may be separate from the memory component 212 and independent from the baseband component 204. Other possible arrangements may include one or more RF components and one or more baseband components being on one or more chips with all of the required memory and processing power to perform the GPS functions. In yet other implementations, multiple chips may be used to implement the GRR 114 and may be combined with technology such as flip-chip packaging.

The GGR 114 may also have a time/frequency component 216. The time/frequency component 216 may provide timing for tracking loops and real time clocks that function during power control conditions. The time/frequency component may be implemented as a real time clock and/or numerical controlled oscillators. The time/frequency component 216 may be in direct or indirect communication with the baseband component 204.

The GRR 114 may operate without aiding information, or alternatively, it may operate with aiding information from a variety of sources and have additional hardware circuitry and software to communicate with a communication network or communicate with another network via the OEM processor 206. The communication may be implemented using standards, such as adopted by the Institute of Electrical Engineers, International Standards Organization, or Cellular communication standards, or by using a proprietary communication approach. Furthermore, the baseband component 204 may include such circuitry as a digital signal processor ("DSP"), an ARM processor, clock components, various memory components, various interface components for external and internal communication, etc.

Figure 3:
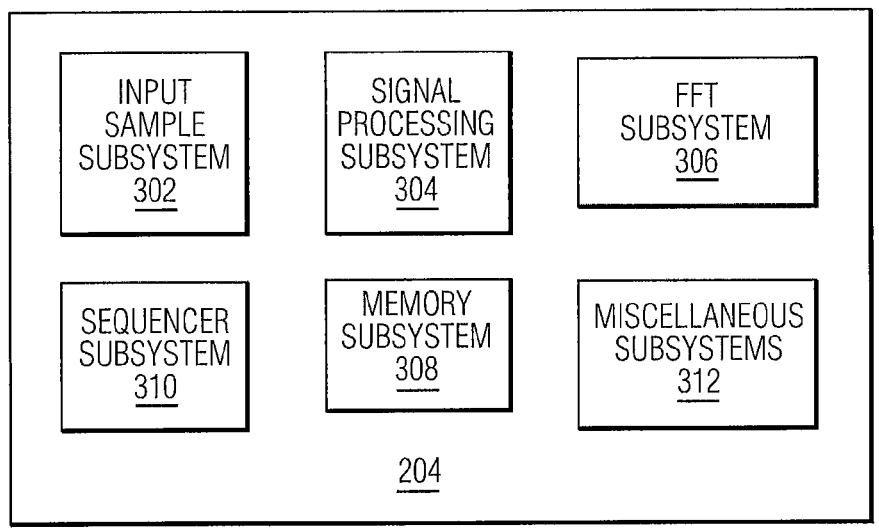
FIG. 3 is a block diagram showing subsystems of a baseband chip from the GPS receiver of FIG. 2.

In FIG. 3, a block diagram shows subsystems of an embodiment of the baseband component 204, including an input sample subsystem 302, a signal processor subsystem 304, a FFT subsystem 306, a memory subsystem 308, a sequencer subsystem 310, and another "miscellaneous" subsystem 312. For convenience herein the subsystems may be referred to as groups of processes or task implemented along with associated hardware. The division of tasks or functionality between the subsystems typically is determined by design choice.

In different implementations, the different subsystems may share functionalities in different ways, or there may be more a less subsystems. For example, in some implementations the sequencer subsystem 310 may not be a separate subsystem. Rather a part of the sequencer functionality may reside in one subsystem while the remaining functionality resides in another subsystem.

The input sample subsystem 302 receives signal data from the RF component 202, FIG. 2, and stores the signal data in RAM that is part of the memory subsystem 308, FIG. 3. Raw digitized signal data or minimally processed decimated signal data may be stored in RAM. The ability to store the digitized RF signals may occur in one of two ways. The first is that data may be gathered by the input sample subsystem 302 in increments of 20 milliseconds and stored in RAM with the process being repeated over and over. The other approach is for the input sample subsystem 302 to use a cyclic buffer in RAM. For example the input sample subsystem 302 would fill a region of the RAM and then overwrite the data upon cycling through the buffers. Such an operational approach would have the software set up the signal processing subsystem 304 and the FFT subsystem 306 in such a way to process the signal data fast enough before the signal data is overwritten in the cyclic buffer. The operational approach may be selectable with the software configuring the approach that best meets the needs of the user and RF environment upon the GRR 114 being initialized. In other embodiments, the operational approach used by the input sample subsystem 302 may be changed during operation of the GRR 114.

The memory subsystem 308 manages the memory resources of the GRR 114. A single memory area may be subdivided into different types of memory areas. Examples of the subdivided memory areas may include input sample memory, coherent buffers, cross-correlate memory, non-coherent buffers, channels state, track history, and report memory. The input sample memory may also be subdivided further into channels with the signal processing subsystem 304 and FFT subsystem 306 accessing different channels with context switching between the channels.

The miscellaneous subsystems 312 may include hardware and software for implementing a convolutional decoder (such as a Viterbi decoder) for WAAS and Galileo data decoding. The miscellaneous subsystems 312 uses data from the memory subsystem 308 and may provide information to other subsystems by writing into the channel state RAM area or other control/status areas in the memory subsystem 308.

Figure 4:
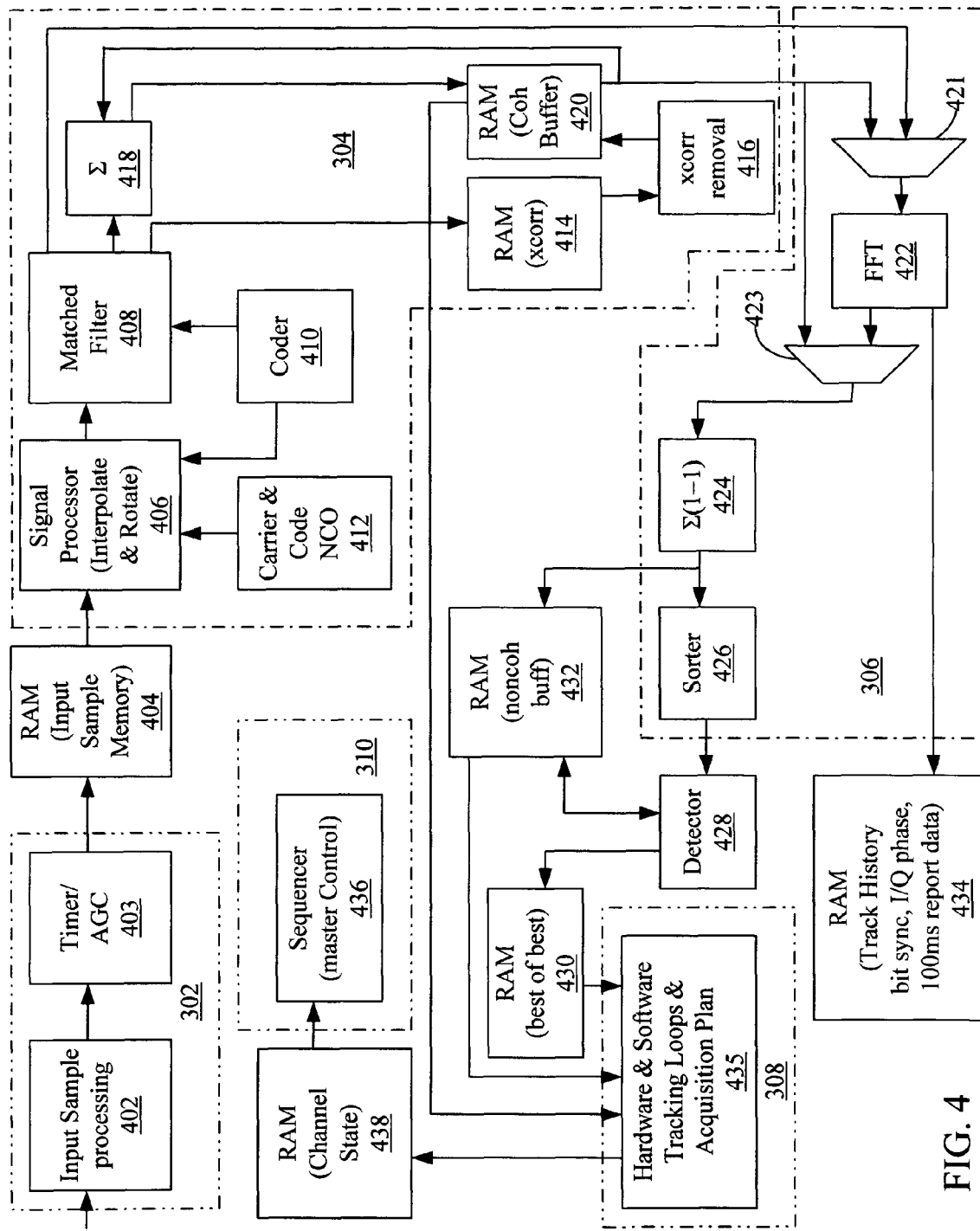
FIG. 4 is a block diagram illustrating general data flow between subsystems of the GGR receiver operating in a GPS mode of FIG. 2.

Turning to FIG. 4, a diagram of signal flow between the subsystems of the GRR 114 of FIG. 1 operating in a GPS mode is shown. A RF signal, such as a CDMA GPS satellite signal, is received by the RF component 202, FIG. 2, and passed to the input sample processing subsystem 302, FIG. 4. The input sample processing subsystem 302 may include an input sample processing block 402 and a Timer/Automatic Gain Control (AGC) block 403. The Timer/AGC block 403 is made up of a number of counters, timers, and alarm generators that are used to sample input pulses of the input signal. The Timer/AGC block 403 may also create interrupts, start software and hardware functions at known times as well as conducting synchronization, and frequency and phase measurement. The Timer/AGC block 403 may provide the ability to synchronize two systems or subsystems by generating precision time alignment pulses or by accepting input pulses from other systems in addition to making relative frequency and phase measurements. For example in systems having a low power real-time (RTC) clock with a low cost watch type crystal, the watch type crystal may be calibrated to GPS time by the Timer/AGC block 403 in order to use the low cost low power RTC during power control conditions.

The input signal may be divided into digital samples in the input sample processing subsystem 402 with the output being stored in random access (RAM) memory 404. The RAM may be any type of read/write memory that may be written to and read from at a rate to keep data flowing between the input sample subsystem 302 and the signal processing subsystem 304. The signal processing subsystem 304 may have a signal processor 406 that interpolates and rotates the received signals from RAM 404.

The signal processor 406 may be used to remove the carrier Doppler and code Doppler from the received signals before the received signals are further processed and filtered. The signal processor 406 may be reconfigurable to operate in a variety of different sampling and decimation modes. In the highest performance mode, for example, the signal processor 406 may use sixteen samples per chip input and produces eight phase eight samples per chip output. In another mode the signal processor 406 may have four samples per chip input that may be interpolated to sixteen samples per chip by repeat sampling and filtering to produce better code phase output while reducing loss that typically occurs at low sampling rates. The modes of the signal processor 406 may be software controlled via parameters that are passed into the signal processor through the channel RAM.

Thus, the signal processor 406 extracts the input samples from the RAM 404 and prepares them for use by the matched filter 408. Depending on the mode of the matched filter 408 the input samples will be interpolated and/or decimated to the correct sampling rate for the matched filter 408. For example if the input samples are stored at 8f0 and the matched filter mode warrants using samples at 2f0, the signal processor 406 will decimate the input sample stream to 2f0. This provides additional flexibility in using various matched filter modes for various channel/satellite vehicle processing. The signal processor 406 may also rotate the complex input samples to remove the residual carrier Doppler from the signals and may be accomplished using the carrier NCO and code NCO outputs in conjunction with the input sample stream.

The signal processor subsystem 404 may also include a matched filter 408, coder 410, carrier and code numeric coded oscillator (NCO) 412, cross-correlator block 414, cross-correlation removal block 416, and a coherent summation block 418. The signal is processed and specific satellite signals identified. The carrier and code NCO 412 generate the pure carrier and code signals for use by the signal processor 406. The carrier and code NCO 412 may be programmable oscillators that may use counters to implement. The use of independent carrier and code NCOs for various channel/satellite vehicle processing provides flexibility for supporting the different types of processing modes in the GPS receiver.

The carrier and code NCO 412 enables a carrier to code transfer that does not require multiplication steps. Typically carrier to code aiding is done with limited resolution multipliers. The carrier and code phase transfers may be accomplished with an accumulated remainder without any error between carrier and code phase. It enables very narrow code loop bandwidths without the slippage or drift between the carrier and code phase as found in implementations that use limited resolution multipliers. The code phase is locked to the carrier and small adjustments may be made to the code phase relative to the carrier. By keeping track of the adjustments, a full resolution carrier and code phase may be reconstructed from few bits and flip-flops than other known methods.

The matched filter 408 may be configurable for various precision levels and code phase fractions. The GPS code is 1023 chips long and the match filter 408 may process or despread a full millisecond of the GPS code when operating in a full mode. In another mode, four subdivisions may be feed into the FFT to improve the frequency range or bandwidth searched per correlation. Yet, other modes may double the number of chips by dividing the chips. Thus, a tradeoff may be made between a fractional division in order to double the precision of the data that is correlated. The mode of the match filter 308 may be controlled and configured by the software depending on the operation mode and the power control setting of the GRR 114.

For example if the GRR 114 has information that only a fraction of the code chips need to be searched or tracked, the matched filter 408 may be set in half mode or a smaller mode. Such configuration will enable the use of smaller amounts of memory and result in a lower throughput data rate for the matched filter 408 and its outputs. On the other hand if the entire code phase needs to be searched, the matched filter 408 may be configured in a full mode making full use of processing power. The use of programmable T1 epochs allow for various coherent integration times for various channel/satellite vehicles thereby providing different frequency resolution in the searches.

The signals after being processed by the signal processor subsystem 304 are passed via RAM (coherent buffer 420 and cross-correlator 414) to the FFT subsystem 306. The cross-correlator 314 may be used to identify despread signals from a weak satellite. The software may save the output of signal processing subsystem 304 and makes it available to the FFT subsystem 306 for further cross correlation processing.

The cross-correlator 414 holds the output of the matched filter 408 in complex form (I,Q) for use by a cross-correlator removal process. In the cross-correlator removal process, some weak signal data from the past is required and strong signal processing is typically completed before the weak signals processing commences. This cross-correlator 414 provides the flexibility in allowing for more lag in the strong signal processing than other known approaches.

The coherent buffer 420 may be a first in first out (fifo) buffer that passes blocks of data from the output of a coherent accumulator to the input of the FFT 422. Each block of data in the coherent buffer 420 represents the shortest integrating time in the system and is associated with a scale factor to keep it within eight-bits (may be an exponent representation) of the value stored in FIFO1. Normalization may occur between the data stored in the coherent buffer 420 in order to have common scaling between the data supplied to the FFT 422. When operating in a locked mode, the data from the matched filter 408 may be directly feed to the FFT 306.

The coherent buffer 420 holds the output of the matched filter 408 as a complex value (I, Q). The coherent buffer 408 may be shared between channels or may be dedicated under software control. This provides flexibility for optimum use of the memory resources. For example if the receiver has information that allows processing of only the NCS buffers or peak buffers, then the coherent buffer 420 may be shared between channels resulting in memory resource savings.

The FFT subsystem 306 may include a multiplexer 421 that multiplexes the output of the matched filter 408 and data from the coherent buffer 420 and may be coupled to the Fast Fourier Transfer (FFT) block 422. The FFT subsystem 306 may also include a second multiplexer 423, a filter block 424, and a sorter block 426. The output of the FFT subsystem 306 may be from the sorter 426 to a detector block 428, from the non-coherent summation of the signal magnitude 424 to the non-coherent RAM 432, and from the FFT 422 to the Track history in RAM 434.

The track history in RAM 434 is a channel dependent buffer that may be generated for each channel. It contains information about the hardware tracking loop and its inputs are a time history. This channel dependent buffer may be used by software to execute software tracking loop algorithms to compute CNO, loss of lock and measurements. This information may also be used to run software tracking loops if the system warrants. Thus, the Track history in RAM 434 provides flexibility and enables a tradeoff between hardware and software processing for different channels. The Track history buffer may be enabled or disabled for various channels independently.

The FFT subsystem 306 is configured to enable short coherent integrations and combine them and get the effect of doing many times the correlations at different offset frequencies and avoids having to rerun the signal processing subsystem, thus resulting in a power savings. The FFT 422 may also generate other types of data for use by the GRR 114, such as, for example, bit-sync and generation of a frequency discriminator for use by the tracking loops.

The detector 428 interfaces with the non-coherent RAM 432 and writes the data extracted to RAM 430. The non-coherent RAM 432 is a buffer that contains a three dimension histogram of code offset, millisecond offset and frequency offset that may be resolved by choosing the largest peak in the non-coherent RAM 432. Bias removal and scaling also may occur within the data in the non-coherent RAM 432.

A list of the largest eight peaks may be stored in memory to aid in selection of the largest peak. In other implementations, different amounts of the peaks may be stored. The list may be implemented as a linked list or other searchable data structure.

In one implementation, the architecture obtains data bit synchronization for signals with a carrier to noise (C/N0) ratio at or lower than 21 dB Hz. Two different approaches are described below for resolving approximately 1 ms of ambiguity within a 20 ms data bit in the signal transmitted by a given satellite. In other words, the approaches accurately determine, within a 20 ms window, the time at which a data bit transition has occurred to accurately locate a bit transition in the transmitted signal. The approaches include a time domain histogram approach and a frequency domain histogram approach.

In the time domain histogram approach, the architecture creates a time domain histogram from time domain samples of the signal transmitted by a given satellite. In summary, the architecture sums samples taken at a pre-selected rate (e.g., 1 ms samples) over a moving window with a pre-selected length (e.g., 20 ms). Subsequently, twenty different hypotheses are postulated, one for each 1 ms shift of the moving window. A histogram with twenty bins (each corresponding to a different hypothesis) is then built by accumulating the sum of the linear envelope, ($\sqrt{I^2+Q^2}$), over successive data bits. The accumulation results in bins in the histogram of differing magnitudes. The bin with the largest magnitude corresponds to the hypothesis that is closest to the true data bit transition.

In one implementation, the architecture may then obtain a refinement of the estimate by performing, a multipoint interpolation on the bins. For example, the architecture may perform a three-point interpolation using the largest bin and two adjacent bins, one on each side of the largest bin.

In the frequency domain histogram approach, the architecture takes a moving window of pre-selected length (e.g., 20 ms). The window may include twenty (20) 1 ms samples. The architecture applies a sample to each of twenty (20) inputs of a multi-point Fast Fourier Transform (FFT) circuit. As one example, the FFT subsystem may determine a 32 point FFT. Subsequently, a pre-selected number, for example twenty, different hypotheses are postulated, such as one hypothesis for each 1 ms shift of the moving window and twenty corresponding FFT operations each corresponding to a unique hypothesis.

The architecture may then build a two dimensional histogram. One axis or dimension of the histogram may correspond to the 32 FFT output bins, and the other axis may then correspond to the twenty hypotheses. The histogram may be built by accumulating the linear envelope, ($\sqrt{I^2+Q^2}$), over successive data bits. The accumulation results in bins in the histogram of differing magnitudes. A bin may be a counter or a more complex structure, implemented in either hardware or software. The bin with the largest magnitude corresponds to the hypothesis that is closest to the true data bit transition and for the frequency that is closest to the input carrier frequency. Hence, a search across the frequency dimension gives the architecture the closest frequency. At that frequency, the architecture then searches the hypothesis axis for the best bit synchronization (bit transition) hypothesis.

Simulation results are presented below to highlight the performance of the two approaches noted above. The simulations assume equally likely random data bits of +1/−1. The simulation runs over approximately 25,000 trials, with a statistical analysis set forth below. For each trial, a stopping condition was in place, and was chosen such that the accumulations occur for longer periods when the signal is weaker, and when the number of transitions is less.

A time based stopping condition may be determined by accumulating the envelope of the difference between the present data bit and the previous data bit, ($\sqrt{(I_1^2-I_2^2)+(Q_1^2-Q_2^2)}$), summing over all the hypotheses. Note that the difference is noise only, if there is no actual bit transition and proportional to twice the signal amplitude if there is a transition. The accumulations terminate when the accumulated difference reaches a preset threshold. At weak signal strengths, the signal amplitude is smaller and takes longer to reach the threshold and hence the simulation runs longer.

A frequency based stopping condition may be determined by accumulating the envelope as noted above, but having the accumulation performed on the output of the frequency domain histogram. That is, the architecture accumulates the envelope of the difference between the present data bit and the previous data bit (over all frequency bins) and sums over all the hypotheses.

For the results demonstrated below, the time based stopping condition may be employed for both time and frequency histogram approaches. In the simulations, the true bit transition is randomly generated anywhere in the range of 0-20 ms. If the error between the estimate and the true transition is greater or equal to 0.5 ms, an error is declared. The error statistics are obtained from a pre-selected number (e.g., 25,000) of trials. The number of transitions (and time to obtain bit synchronization) is also determined. In addition, a time out condition with a pre-selected duration (e.g., 8 seconds), checked with a time out counter, is employed to prevent the loops iterating indefinitely.

Table 1, below, provides a comparison of the time domain and frequency domain histogram approaches assuming a known carrier frequency. The probability of wrong detection of the bit transition may be used to compare and choose between the two algorithms for any particular implementation.

TABLE 1

| C/N0 (dBHz) | Avg. number of transitions | Probability of wrong detection | |
|---|---|---|---|
| | | Time Histogram | Frequency Histogram |
| 45 | 2.75 | 0.00308 | 0.00316 |
| | 3.26 | 0.00052 | 0.00028 |
| | 3.73 | 0.00004 | 0.00008 |
| 30 | 10.95 | 0.00188 | 0.00188 |
| | 21.04 | 0.00004 | 0.00004 |
| 22 | 70.7 | 0.00136 | 0.00136 |
| 21 | 75.3 | 0.00376 | 0.00464 |
| 20 | 79 | 0.01040 | 0.01020 |

Table 2 shows the detection errors for frequency errors within a bin for the two algorithms

TABLE 2

| C/N0 (dBHz) | Frequency error (Hz) | Probability of wrong detection | |
|---|---|---|---|
| | | Time Histogram | Frequency Histogram |
| 22 | 0.0 | 0.00 | 0.00 |
| | 8.0 | 0.00012 | 0.00004 |
| | 15.0 | 0.00824 | 0.00796 |
| | 24.0 | 0.829 | 0.00 |
| | 32.0 | 1.00 | 0.00 |

As can be seen from Table 1, when the carrier frequency is known, the performance of the two algorithms is similar. Also from Table 2, the performance of the two algorithms is similar for frequency errors within a bin. Note that the bin 0 may be centered at 0 Hz and bin 1 may be centered at 31.25 Hz. The differences at 24 Hz and 32 Hz are due to the fact that in the frequency domain histogram, these frequencies fall in the vicinity of the adjacent bin.

One advantage of the frequency domain approach is that it the architecture may employ if as a joint frequency synchronization and bit synchronization. That is, the frequency domain algorithm, while providing the benefits of the time domain approach, also operates over multiple frequency trials in parallel. A performance curve of the frequency domain histogram approach for a small frequency offset (2 Hz), where the criteria for stopping is the time domain based threshold count. The same threshold value was used for all C/N0 and for all frequency offsets plotted in FIG. 3.

The performance curve is the time to acquire bit synchronization across C/N0 for the case where there is a small frequency error. At 22 dB, only 1 error was observed out of 25,000 trials. Thus the performance of the frequency domain histogram approach is similar to the time domain approach, across C/N0s for small frequency offsets when using the same stopping criterion.

The time to acquire bit synchronization across C/N0 for the case where the stopping criterion is based on the output of the frequency domain histogram may be shown as a curve of the time to acquire bit synchronization across C/N0 for the case where there is a small frequency error of 2 Hz. The curve of bit synchronization has the advantage of simultaneously performing frequency estimation and bit synchronization. Note that the time domain approach employs a certain amount of information regarding the frequency error to accurately to provide reliable bit synchronization (in a serial fashion). In the joint approach, however, the architecture may obtain an estimate of the carrier frequency along with the bit boundary in a parallel fashion.

The architecture further includes interpolation and smoothing circuitry and methods to that improve resolution of carrier frequency and code phase estimates for ranging signals transmitted by the SPS satellites that arrive in weak condition. In one implementation, the architecture employs discrete values of carrier Doppler and code phase, and the interpolation and smoothing techniques improve on the discrete values. For example, the interpolation and smoothing techniques may process the quantized frequency and time bins prepared as noted above with regard to bit synchronization and acquisition in order to improve a carrier frequency determination and a time determination.

The architecture may perform carrier frequency interpolation in different ways. For example, assuming seven 1 ms coherent samples are input to an eight point FFT (with one zero for the remaining input) and 3426 (6*571) times non-coherent integration results in a total time of 24 seconds and the FFT computes eight bin magnitudes each of resolution 125 Hz. Without interpolation, the bin with the maximum magnitude would ordinarily be chosen, yielding a possible error in the range of −62.5 to 62.5 Hz in the absence of binning errors. Binning errors, which happen at low C/N0s, may result in larger errors.

In the analysis that leads to choosing a frequency interpolation technique, the frequency error is swept across one bin and the estimate for each frequency error is obtained as the bin with the maximum magnitude. The architecture then adjusts the frequency estimate by using an interpolation to improve the estimate, for example, a multi-point (e.g., 3-point) parabolic interpolation. This interpolation may employ the maximum magnitude bin and the magnitude of the adjacent bin on each side of the maximum.

The peak position of a sampled quadratic can be located using the sampled peak and the two adjacent peaks. For a sampled quadratic function y, with sampled peak $y_m$ and the true peak $\delta$ samples from m, the three samples about the peak are related by $$y_{m-1} = a(m-1-\delta)^2 + b$$

$$y_m = a(m-\delta)^2 + b$$

$$y_{m+1} = a(m+1-\delta)^2 + b$$

Setting m=0 and solving for $\delta$ yields $$\delta = \frac{(y_{m+1} - y_{m-1})}{(2y_m - y_{m+1} - y_{m-1})}$$

and m−$\delta$ provides an accurate peak of the sampled quadratic.

Evaluating code phase interpolation may be performed, in one instance, assuming zero frequency error and a total range of ±1 chip. Thus, for 0.5 chip correlator spacing, there are five (5) code phase bins, each spaced 0.5 chips apart, i.e. (−1, 0.5, 0, 0.5, 1). For the other correlator spacings, a similar analysis may be performed.

I and Q samples for each of the five assumed time hypothesis may be generated by the following equations:

$$I = \sqrt{2CT/N_0} \rho(\tau - \tau_0) + x$$

$$Q = y$$

In the evaluation simulations, the code phase error, $\tau_0$, may be swept across one bin, for example, −0.25 chips to 0.25 chips and the estimate for each error may be obtained by identifying the bin with the maximum magnitude.

The architecture may then improve the code phase error using the three (3) point parabolic interpolation explained above, using the maximum magnitude code phase bin (out of the five bins as explained above) and the magnitude of the adjacent bin on each side of the maximum. Consideration may also be taken to account for the correlation between noise samples for bins, which are spaced less than a chip apart.

Figure 10:
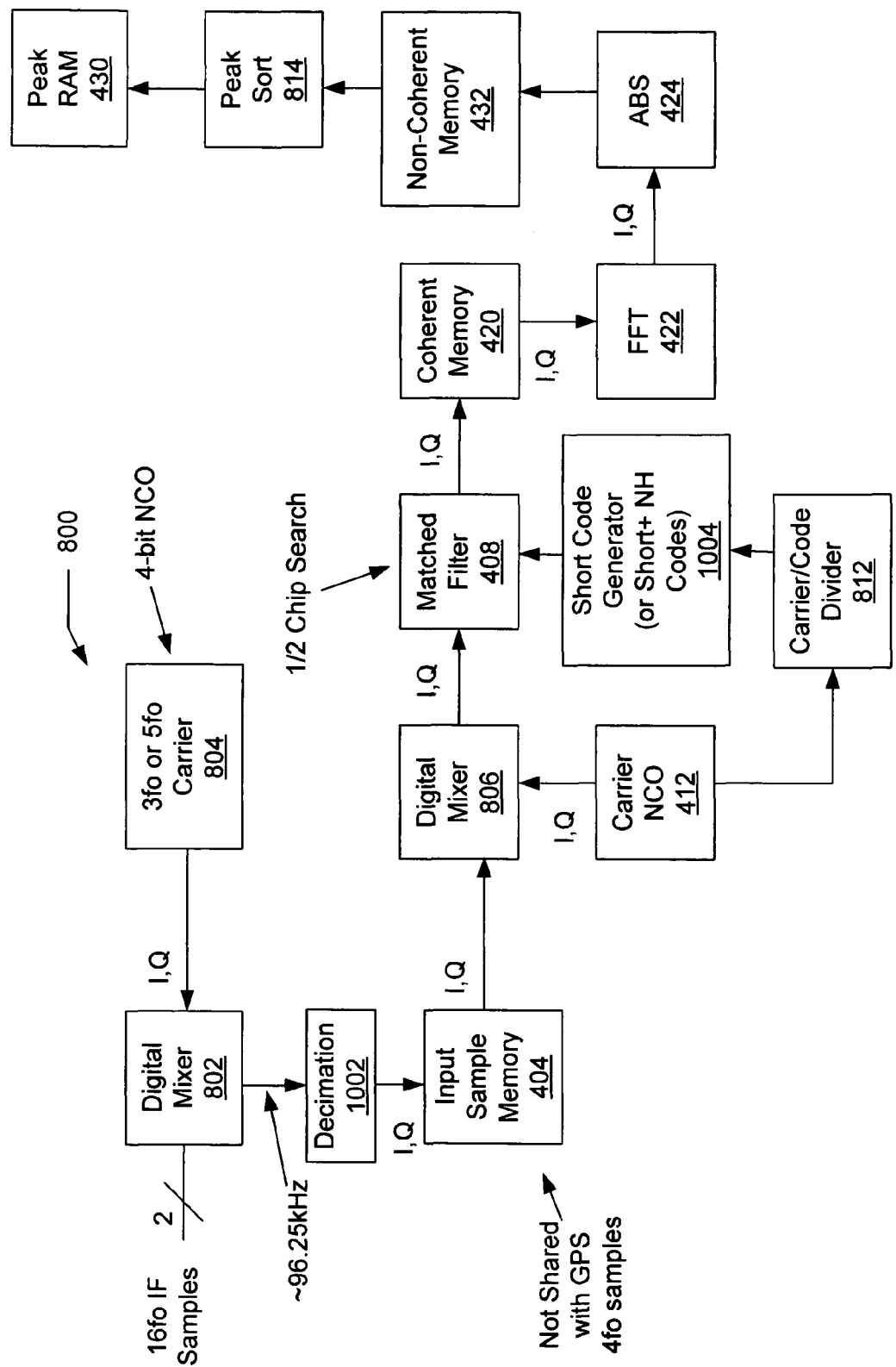
FIG. 10 is a block diagram 800 of the GRR 114 of FIG. 4 with the GRR 114 operating in the Galileo mode attempting to acquire Galileo SV signals.
Figure 11:
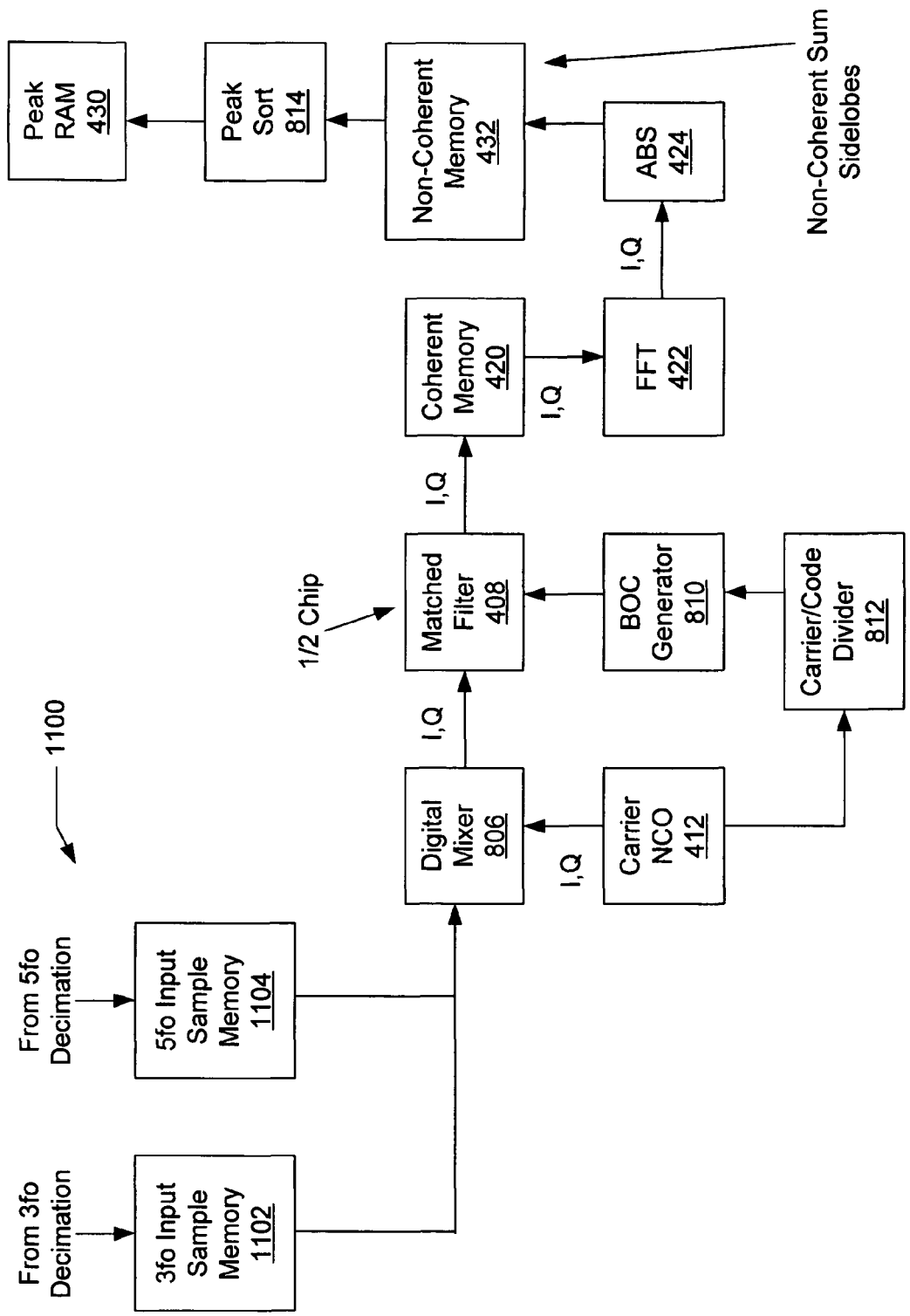
FIG. 11 is a block diagram 1100 that illustrates the combining Galileo signal side lobes when the GGR 114 is in the Galileo mode of operation and attempting to acquire a Galileo SV signal.

An alternate method of interpolation yields the results shown in FIGS. 10 and 11. In the alternate method, the architectures selects four bins from the five bins of the code phase search space, and then performs a four point FFT employing the four bins. The FFT outputs are then zero padded to twice the size and an inverse FFT using the eight point FFT is then carried out. The peak is then estimated from the eight point inverse FFT output. In one implementation, the architecture chooses the four out of the five bins so that the maximum bin and a higher adjacent bin occupy the center of this four bin selection that may be implemented as an array in hardware or software.

The above techniques can be generalized to any correlator spacing desired. For instance, for a correlator spacing of 1/N chips, there would be a total of 2N+1 bins to cover the range [−1:1] chips. From these 2N+1 bins, the architecture may select 2N bins as described above. The architecture may then perform a 2N FFT on these 2N bins (Step 1208), followed by a padding of 2N zeros to the FFT output, and then an 4N size inverse FFT.

Table 3, below, shows the effects of binning errors for the cases considered above (again assuming 1000 trials). Table 3 provides slightly pessimistic bounds for the case of frequency/code phase that lie at the edge of the bin, because in reality these scenarios will result in useful energy in the adjacent bins.

TABLE 3

|  | Pfa for NCS = 571 | | Pfa for NCS = 6 * 571 | |
| --- | --- | --- | --- | --- |
|  | delta_f = 0 | delta_f = fbin_size/2 | delta_f = 0 | delta_f = fbin_size/2 |
| Carrier doppler interpolation (8 pt. FFT) | 17 dB: 0.000<br>15 dB: 0.003<br>12 dB: 0.162 | 17 dB: 0.002<br>15 dB: 0.051<br>12 dB: 0.296 | 17 dB: 0.000<br>15 dB: 0.000<br>12 dB: 0.001 | 17 dB: 0.000<br>15 dB: 0.000<br>12 dB: 0.016 |
|  | delta_tau = 0 | delta_tau = −0.20 chip | delta_tau = 0 | delta_tau = −0.20 chip |
| Code phase interpolation (0.5 chip spacing) | 17 dB: 0.000<br>15 dB: 0.006<br>12 dB: 0.165 | 17 dB: 0.184<br>15 dB: 0.296<br>12 dB: 0.504 | 17 dB: 0.000<br>15 dB: 0.000<br>12 dB: 0.000 | 17 dB: 0.012<br>15 dB: 0.071<br>12 dB: 0.226 |

The effect of the limited bandwidth on the correlation function may be estimated for the code phase parabolic interpolation. For example, assume a chip spacing of ⅛ chip, no binning errors, and parabolic interpolation, with the correlation triangle filtered by a 6 MHz bandwidth filter and an unsynchronized decimator for the ⅛ chip spacing. Near the peak of the correlation triangle, the variance from the filtered correlation triangle is higher due to the flattening in the triangle.

In one implementation, employing Doppler frequency interpolation, the parabolic interpolation with padding of nine zeros may provide an improvement at weak signal levels. For the code phase interpolation, the zero padded FFT algorithm provides lower errors in the center of the bin compared to the parabolic interpolation and in larger variation in mean values.

The architecture also performs peak assignment, for example, to choose the correct set of peaks (one for each satellite) from a given set of multiple peaks for the satellites. The technique for peak assignment may operate on input data including aiding information with respect to an assumed reference position (e.g., the reference position at the center of the uncertainty region). The aiding information, as examples, may include a list of visible satellites (pseudo random noise (PRN) IDs), code phase indices (modulo 1023) for each satellite (e.g., at 1 chip resolution), Doppler values, line of sight (los) vectors to the satellites, a maximum horizontal position error (in meters) and a maximum velocity error (in m/s).

Equation 1 shows the measured data:

$$PRN_1 = \{p_{11}, p_{12}, \ldots, p_{1N}\}$$
$$PRN_2 = \{p_{21}, p_{22}, \ldots, p_{2N}\}$$
$$\vdots$$
$$PRN_M = \{p_{M1}, p_{M2}, \ldots, p_{MN}\}$$

Equation 1

Where there are M satellites and a set of N peaks for each satellite. Each peak is characterized by a corresponding code offset modulo 1023 (i.e., $0 \leq p_{ij} \leq 1022$), carrier frequency, and amplitude. In other words, each element in the above {M,N} matrix is characterized by a code offset, frequency, and amplitude parameter. Thus, element $p_{ij}$ will be characterized by 3 parameters $\{c_{p_{ij}}, d_{p_{ij}}, a_{p_{ij}}\}$ where $c_{p_{ij}}$ is the code phase index of $p_{ij}$, $d_{p_{ij}}$ is the Doppler of $p_{ij}$, and $a_{p_{ij}}$ is the amplitude of $p_{ij}$.

In performing peak assignment, the architecture may assume that the peaks are arranged in the order of decreasing amplitudes for a given satellite, that the satellites are arranged in descending order of their strengths (e.g., based on the first element for each satellite (i.e., each row)), and that aiding information is available for the PRN ids in the measured data (Equation 1).

The first two assumptions together imply that the first row will correspond to the strongest satellite and within the first row; the peaks are arranged in the descending amplitudes. Arranging the data in this manner may improve search speed, in the case where the architecture does not perform an exhaustive search of all possible combinations, while increasing the probability of finding the correct set of peaks.

The peak indices and peak Doppler values may be obtained through the acquisition process (possibly aided). Hence, it is likely that the measured peak indices and Doppler values in Equation 1 lie within a window, bounded by position uncertainty, velocity uncertainty, time uncertainty, and frequency uncertainty.

The architecture, in one implementation, will determine a set of correct peaks according to criteria discussed below. The determined set of peaks (given by $[p_{11} \, p_{21} \ldots p_{M1}]$) may be an array with M elements with each element corresponding to a unique satellite. The array of M elements may be implemented in hardware or software as a data structure such as an array, link list, or other structure that maintains the relationship of the array elements.

In determining the set of correct peaks, the architecture may proceed according to the determination technique. The technique generally includes the steps of: Pruning, Upper Bounds, and Applying a Decision Technique. Pruning preprocesses the measured data to reduce the size of the data set (the number of peaks). In the Upper Bounds step, the architecture employs the uncertainty information (position and time) and the LOS vectors to obtain bounds on the uncertainty between the measured index (Doppler) values and the reference index (Doppler) values. During application of the decision technique, the architecture applies a decision technique that employs the uncertainty bounds and the measured data to arrive at a determined set of peaks.

In the discussion below, reference to single differences are references to differences between satellite i with satellite j while double differences are the differences on single differences between a user's receiver and reference data (e.g., the aiding information).

In the pruning step, the architecture reduces the size of the measured data, while employing little or minimal processing. In one implementation, the architecture performs pruning by employing the amplitude information (recall that peaks are arranged in order of decreasing amplitudes).

For example, the architecture may discard all peaks that satisfy:

$$a_{P_{ij}} < k_1 * a_{P_{i1}}$$

where i in the above equation is the satellite number and j=2,3, . . . 8 denotes the position in the set.

$$k_1, (0 < k_1 < 1)$$

is a threshold constant and thus, if $$k_1 = 0.5$$

the architecture discards peaks which are less than half the size of the strongest peak. For the satellites with the strong signals, where a dominant peak stands out, a set with one element per strong satellite may result.

In the step of applying upper bounds, the architecture employs a priori uncertainty information on the position and velocity to obtain upper bounds on the expected code phase index (Doppler) difference between the values provided at the reference and those measured at the true position.

The range measured by the user from the true position at time t to satellite i is given by:

$$r_i(t) = \hat{r}_i(t) - \hat{l}_i(t) * \Delta x + c * b_u(t) + v_i \qquad \text{Equation 2}$$

where c is the speed of light (m/s), $b_u$ is the bias in the receiver's clock (s), The term $v_i(t)$ represents the measurement noise (m). The terms with ^ denote the estimate values (at the reference). The line of sight vectors are given by $$\hat{l}_i(t) = \frac{s_i(t) - x}{|s_i(t) - x|}$$

Note that in the equation 2 above, $r_i(t)$ denotes the range measurement at the true user position u. The first term on the right side $\hat{r}_i(t)$ represents the range measurement at the center of the uncertainty (reference position). The second term denotes the error due to the uncertainty in true receiver position and the third term denotes the bias in the receiver time.

Calculating the single differences from two different satellites, i and j:

$$r_i(t) - r_j(t) = (\hat{r}_i(t) - \hat{r}_j(t)) - (\hat{l}_i(t) - \hat{l}_j(t)) * \Delta x + (v_i - v_j) \qquad \text{Equation 3}$$

In the Equation 3, the left hand side denotes the single difference in ranges between satellites i and j as referenced to the true user position u. The first difference term on the right hand side denotes the range differences between satellites i and satellite j at the center of the uncertainty. The second term represents the error due to the user position uncertainty. Note that this is also a function of the geometry of the satellites.

Rewriting equation 3 to express the double differences and omitting the measurement noise term gives:

$$[r_i(t) - r_j(t)] - [(\hat{r}_i(t) - \hat{r}_j(t))] = (\hat{l}_i(t) - \hat{l}_j(t)) * \Delta x \qquad \text{Equation 4}$$

Similarly for Doppler:

$$[d_i(t) - d_j(t)] - [(\hat{d}_i(t) - \hat{d}_j(t))] = (\hat{l}_i(t) - \hat{l}_j(t)) * \Delta u \qquad \text{Equation 5}$$

where $d_i$ and $\hat{d}_i$ are the measured Doppler at the true user location and the reference location respectively due to satellite i, and $\Delta u$ denotes the uncertainty in user velocity.

Equations 4 and 5 provide the architecture with upper bounds on the double differences (between satellite i and satellite j) in code phase indices (Doppler) between those at the reference position and those measured at the true position.

Next, the architecture applies a decision technique to determine a selected peak for each satellite from the set of peaks obtained at noted above. In one implementation, the architecture employs a cost vector in arriving at a determined set of peaks. Thus, for example, the architecture may select a set of peaks from the matrix in Equation 1 by forming a column vector (one column), where each element in the column vector corresponds to a unique satellite.

For instance, choosing the first elements for each satellite yields the vector:

$$[p_{11}\, p_{21} \ldots p_{M1}]$$

For the chosen column vector, the next step is to form the single differences in their code phase indices and Doppler. For the amplitudes, the architecture may form the corresponding pair wise product of the amplitudes:

$$[(c_{P_{11}} - c_{P_{21}})\,(c_{P_{11}} - c_{P_{31}}) \ldots (c_{P_{11}} - c_{P_{M1}})\,(c_{P_{21}} - c_{P_{31}}) \ldots \\ (c_{P_{21}} - c_{P_{M1}}) \ldots (c_{P_{(M-1)1}} - c_{P_{M1}})]$$

$$[(d_{P_{11}} - d_{P_{21}})\,(d_{P_{11}} - d_{P_{31}}) \ldots (d_{P_{11}} - d_{P_{M1}})\,(d_{P_{21}} - d_{P_{31}}) \ldots \\ (d_{P_{21}} - d_{P_{M1}}) \ldots (d_{P_{(M-1)1}} - d_{P_{M1}})]$$

$$[(a_{P_{11}} * a_{P_{21}})\,(a_{P_{11}} * a_{P_{31}}) \ldots (a_{P_{11}} * a_{P_{M1}})\,(a_{P_{21}} * a_{P_{31}}) \ldots \\ (a_{P_{21}} * a_{P_{M1}}) \ldots (a_{P_{(M-1)1}} * a_{P_{M1}})]$$

The architecture may employ the absolute values of these terms. For the code phase indices, the architecture may employ:

$$|c_{P_{11}} - c_{P_{21}}| \text{ if } |c_{P_{11}} - c_{P_{21}}| < 512$$

$$1022 - |c_{P_{11}} - c_{P_{21}}| \qquad \text{otherwise}$$

Note that the size M of the single difference vectors above is M=2. Thus for M=5, there are a total of 10 elements in each of the vectors above. The architecture repeats the above step for the estimates at the reference position. Thus for the given code phase indices (Doppler) at the reference position (a vector of size M), the architecture forms the single differences. In addition, the architecture also forms the magnitude of the single differences for the line of sight vectors. All the resulting vectors are of size M=2 in the current implementation.

The architecture then, by employing the results of the bounding steps, obtains the upper bound in the error differences (double differences) between the values at the true position and the reference position (right hand sides of equations 4 and 5).

For the code phase indices, the bound will be: position uncertainty (in chips)*LOS vectors (magnitude of single differences).

For Doppler values, the bound will be: (velocity+position) uncertainty (in Hz)*LOS vectors (magnitude of single differences).

The architecture also obtains the (double difference) error term for code phase indices and Doppler. The error term is the difference in the single difference values at the true position (explained above) and those at the reference position (explained above). Note that the error term vector is also of size M=2.

Next, the architecture compares the error terms against the bounds on an element-by-element basis. If an element of the error term is greater than the corresponding bound element, the architecture increases the cost vector proportional to the inverse of the peak amplitude pair wise products formed as noted above and proportional to the difference in the error terms (double differences) and the upper bound. Note that this weight will be assigned to both elements (i.e. peaks) that were used in forming the single difference. Then, if the error term is less than the corresponding bound, the cost vector is not changed. The architecture may follow this procedure for all M choose 2 elements. At the end of this step, the architecture obtains a cost vector of size M.

The architecture may then repeat the same procedure for the Doppler terms without resetting the cost vector. When the cost vector is equal to zero (all M elements identically zero), the architecture may determine that this corresponds to the optimum peak vector, and stop the search. Otherwise, the architecture saves the cost vector, resets it and returns to choose a new set of peaks as noted above with regard to forming the column vector.

When all combinations of peaks have been searched without having a zero cost vector, then the architecture may select the set of peaks with the lowest cost vector magnitude. In the case of a tie, the architecture may select the set of peaks that occurs, for example, first in the search process.

The discussion below details the tracking system for the architecture for strong and medium signal operation. The following abbreviations may be used below: Alpha, Beta: Generic filter coefficients that may take different values at different instances; FFT: Fast Fourier Transform; SPS: Satellite Positioning System; HWTL: Hardware Tracking Loop; NCO: Numerically Controlled Oscillator; PDI: Pre Detection Integration; RAM: Random Access Memory; S_Gain: Filtered Signal amplitude estimate employed to normalize the tracking loops; SWTL: Software Tracking Loop; T1: Basic Time epoch for Subsystem ; Threshold, Threshold1, Threshold2: Generic Threshold values that may take different values at different times.

The hardware and software tracking loops and acquisition plan 335 resides in the memory subsystem 208 in addition to the track history, bit sync, I/Q phase, and the 100 ms report data in RAM 304, 314, 320, 332, 334 respectively. The hardware tracking loops implement simple tracking loop equations in hardware and are controlled by software setting various parameters in the channel records. In some cases of extreme signal conditions (very weak signals or widely varying dynamic conditions) it may be preferable to run more complex signal tracking algorithms as opposed to simple tracking loops. In such cases the hardware tracking loop will be aided by the software tracking loop to obtain enhanced performance. The capability to have both hardware and software tracking loops provides this flexibility.

The coherent data may be used by software for determining parameter changes in the hardware and software tracking loops. An advantage over the prior art is the ability to access both the coherent data and the phase history data with respect to time. The use of this data enables the GPS receiver 100 to adjust the processing of the data signals and the data may also acts as an indication of the quality of operation of the GPS receiver 100.

The tracking loops may be split into two components. The first being a hardware tracking loop and the other being a software tracking loop. The hardware tracking loop operates at a high rate of speed. The hardware tracking loop is partially controlled by the NCO and counters. The software tracking loop operates at a lower speed and may use more complicated algorithms than the hardware tracking loop. The hardware tracking loop and software tracking loop makes use of parameters contained in the memory subsystem 208. The use of two types of tracking loops enables a level of redundancies and monitoring of the operation of the hardware while increasing the efficiency of the hardware tracking loop based upon the algorithms used by the software tracking loop.

A previously discussed, an area of memory may be divided into channels that are groupings of input signal data. The channels may then be processed by the signal processing subsystem 304 followed by the FFT subsystem 306 sequentially. The signal data is passed between subsystems via the memory subsystem 308. The state of the different channels is contained in the channel state RAM 338.

The memory subsystem 308 may further have memory that is rewritable such as RAM or permanent such as ROM for storing machine-readable encoded instructions. The term RAM and ROM are used to describe the operation of a type of memory that may be implemented using specific types of memory such as SDRAM, DDR, PROM, EPROM, or EEPROM memory to give but a few examples. The machine-readable instructions are typical encoded as modules that when executed control numerous functions of the GGR 114 of FIG. 1. Examples of such modules are control loops, expert systems, power control, tracking loops, and types of acquisition. Similarly, other modules may control the different internal and external interfaces and messaging between subsystems and between the GPS receiver and OEM equipment.

The sequencer subsystem 310 has a sequencer controller 436 that control a sequencer that oversees the operation of the signal processing subsystem 304 and another sequencer that oversees the operation of the FFT subsystem 306. Rules are implemented that keep the two sequencers synchronized. The rules are commonly called lapping rules and prevent one sequencer from advancing to another channel before the current sequencer has processed that channel's data. In other implementations, a single sequencer may be implemented to control the separate subsystems.

Figure 5:
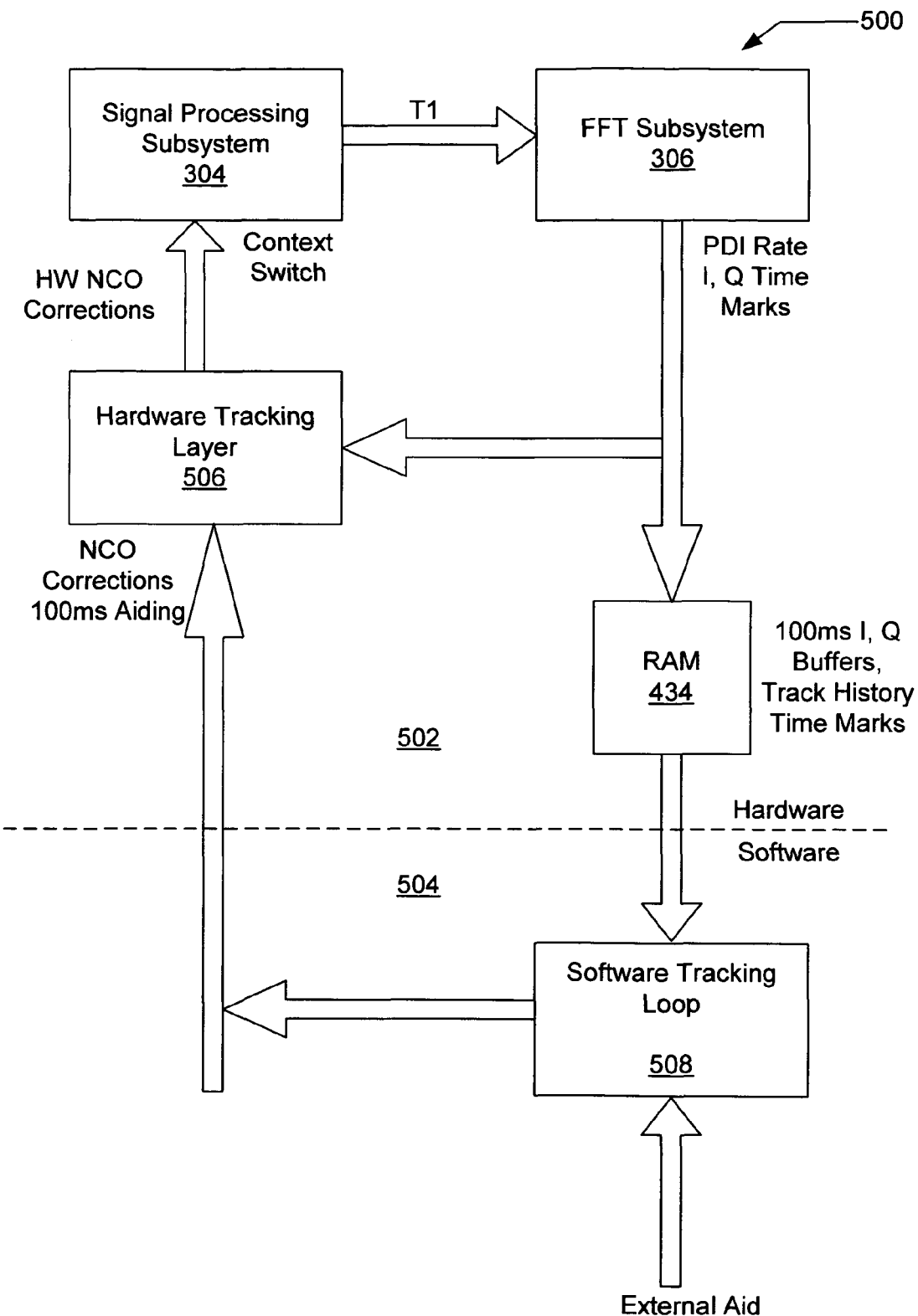
FIG. 5 is a diagram of the division between software and hardware within the GPS receiver of FIG. 2.

Turning to FIG. 5, a diagram 500 of the division between hardware and software processing of the data signal within the GRR 114 of FIG. 1 is shown. The diagram 500 is divided between a hardware side 502 and a software side 504. On the hardware side 502, there may be the signal processing subsystem 304, FFT subsystem 306, the non-coherent summation and track history buffer (RAM) 434, and a hardware tracking loop 506. On the software side there may be a software tracking loop 508. In other implementations, there may be more or fewer blocks shown in a diagram such as FIG. 5. The purpose of FIG. 5 is to provide a conceptual overview of how once the hardware is setup there is limited interaction directly from software. There may be numerous other software processes and tasks that are not shown in FIG. 5 such as, for example, the expert system and power control to name but a few.

The GPS data signal be processed by the signal processing subsystem 304 and passed to the FFT subsystem 306 at a T1 interval. The output of the FFT subsystem 306 may be I and Q data, and time marks at a rate that PDIs (an amount of data from the coherent buffers that is needed by the FFT in order to operate) are available. The data may be stored in the NCS/TH Buffer 434 and sent to the hardware tracking layer 506 that implements the hardware tracking loop. The hardware tracking layer 506 may then feed back hardware NCO corrections that can be used by the carrier and code NCO 412, FIG. 4.

The hardware side 502, FIG. 5 communicates with the software side 504 via memory such as, for example, when the NCS/TH buffer 434 is accessed by the software tracking loop 508. The software tracking loop 508 may operate at a lower speed than the hardware tracking loop and spend more time processing the data contained in memory in order to derive NCO corrections and 100 ms aiding information. Such information is placed into a memory that is accessed by the hardware tracking layer 506 an in turn picked up by the signal processing subsystem 404 at an appropriate time, such as during a context change (switching channels within the memory).

Figure 6:
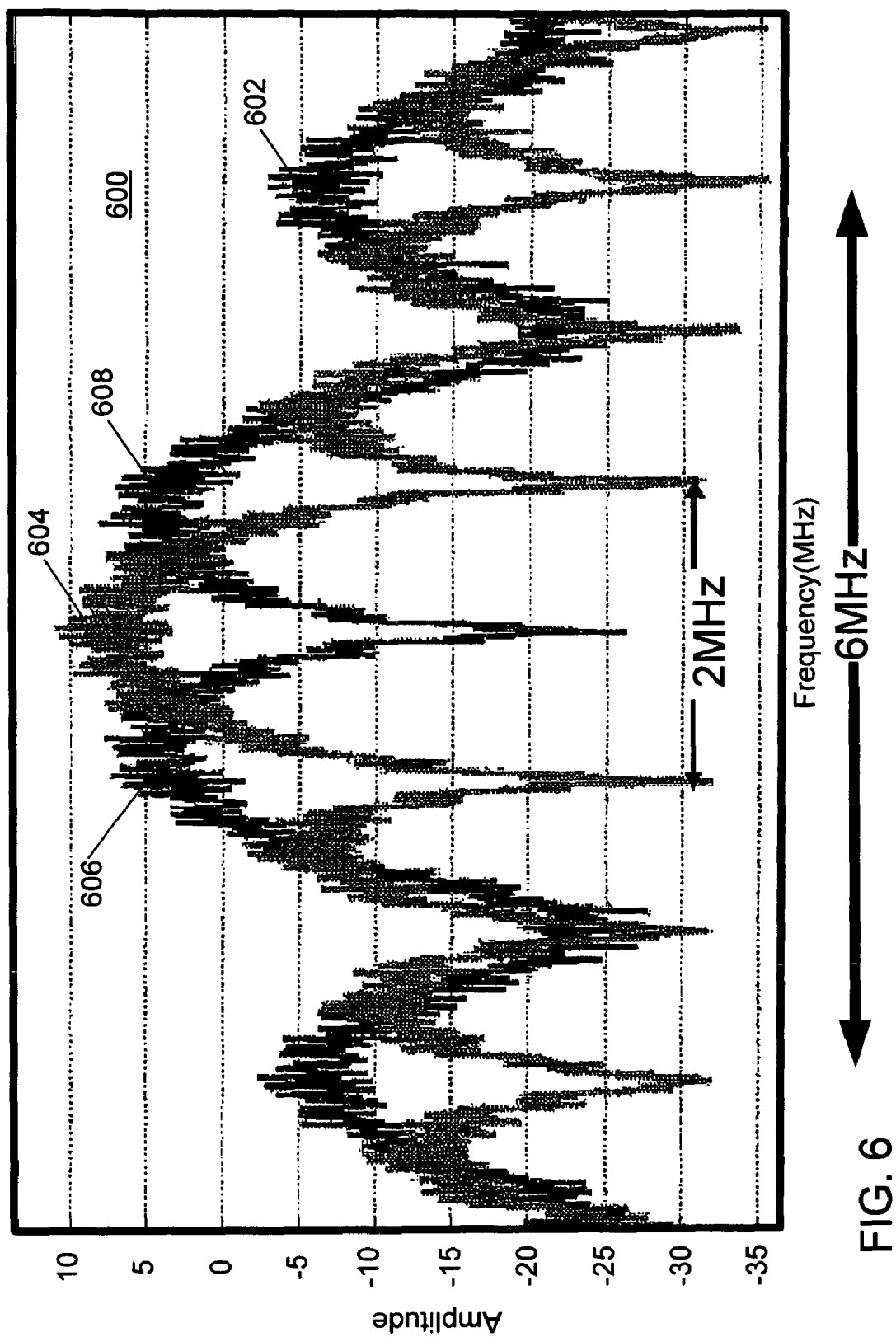
FIG. 6 is a diagram 600 of a Galileo open service signal 602 with a GPS L1 signal 604 overlaid.

In FIG. 6, a diagram 600 of a Galileo open service (OS) signal 602 with a GPS L1 signal 604 overlaid is shown. The Galileo OS signal 602 uses a binary offset carrier (BOC) modulation scheme (more specifically BOC(1,1)) and has longer spreading codes than the GPS signals. Furthermore, two different channels have been allocated in the OS signal; the L1-B data channel and the L1-C pilot channel. The L1-B data channel carries the navigation message whereas the L1-C pilot channel is data-free. The OS signal 602 appears as two side lobes 606 and 608 in FIG. 6.

The pilot channel is characterized by a secondary code that modulates the primary spreading sequence, producing a tiered code with a period of 100 milliseconds. The bit-rate of the L1-C data channel is 250 sps (symbols per second) rather than the 50 sps of the GPS C/A-code. The GGR receiver 114 may perform acquisition of the pilot and data channels separately, and the results of the two processes may be coherently or non-coherently combined in order to exploit the fact that the two signals experience the same code delay and Doppler frequency.

The two side lobes of the OS signal 602 may be 2 MHz apart and the two channels (data and pilot) may be phase locked carriers. The data channel may be modulated with a 4 millisecond short code, while the pilot channel is a 25-bit NH code that is modulated with the short code. The raw data rate of the data or L1-B channel of the OS signal 602 is 250 bps. At ½ rate convolutional encoding the encoding appears to the GRR as a signal that is similar to WAAS encoded signal that may be received by GPS receivers. The separate BOC(1,1) side lobes 606 and 608 may be used by the GRR 114 to provide a GPS-like correlation function for acquisition and anti-jamming capability by processing each of the side lobes 606 and 608. The side lobe modes may be useful for isolating a narrowband jammer. By receiving and isolating the each side lobe we can reject one side lobe if it is being jammed (e.g. when the CNO from that side lobe is lower than the other by a significant amount e.g. 2 dB).

Further, the combining of the side lobes 606 and 608 may allow for improved carrier-to-noise performance of the GRR 114 during acquisition and tracking operations, over using a single side lobe.

Figure 7:
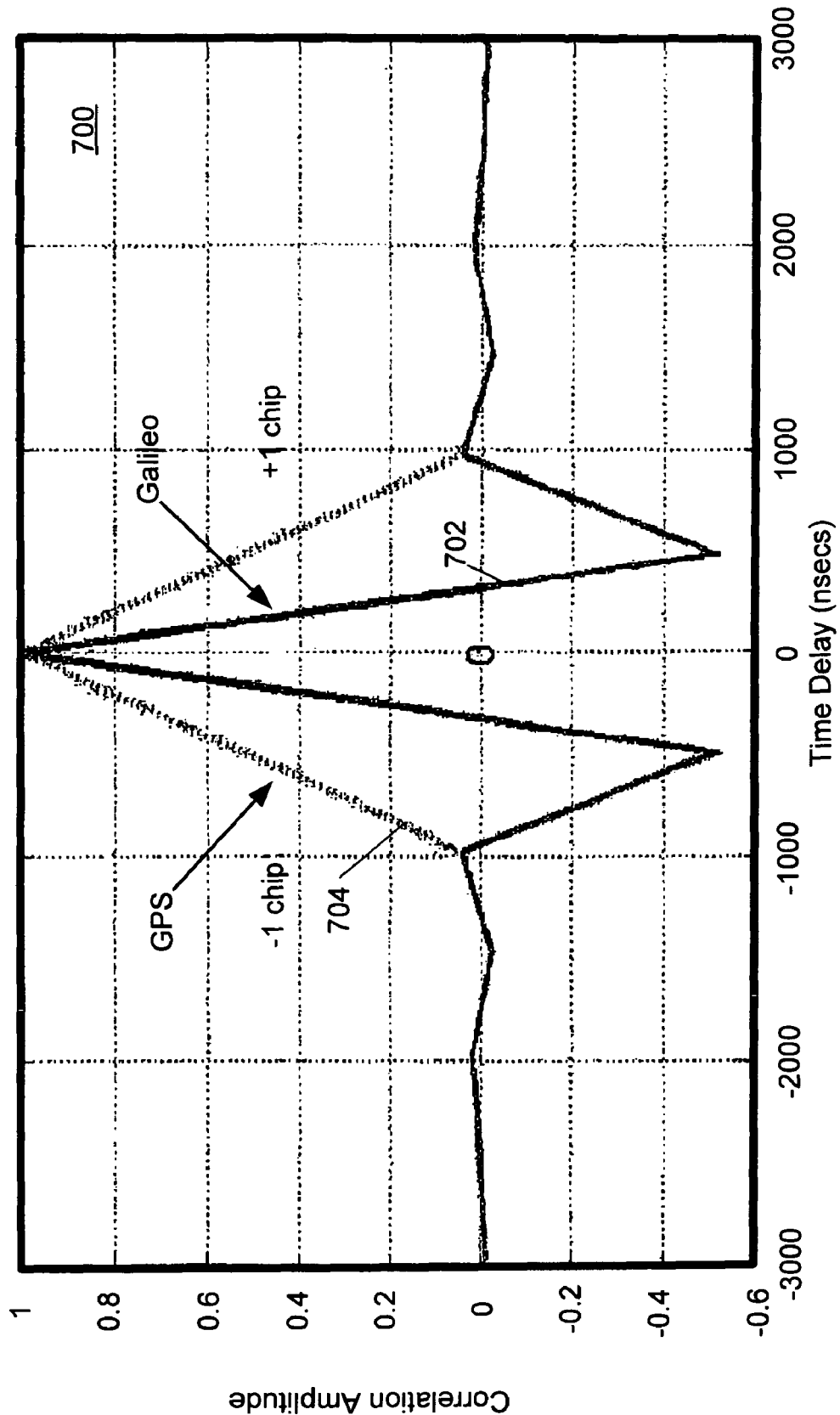
FIG. 7 is a graph of the correlation functions performed by the GGR of FIG. 1

Turning to FIG. 7, a graph 700 of the correlation functions of a BOC(1,1) signal 702 and traditional GPS signal 704. As can be seen in the graph 700, both signals fall within plus or minus a chip. The size of a chip is $1/(1.023 \times 106)$ µseconds in both GPS and Galileo BOC cases, one of the reasons to use side lobe mode to create a GPS like correlation shape. Otherwise, the ½ chip search does not work well for BOC carrier signals because the peak (see FIG. 7) is too narrow and essentially there is a good chance of missing the peak energy point. Because both of the signals 702 and 704 fall within plus or minus one chip, either signal may be acquired using a half chip acquisition approach previously employed with GPS L1 C/A signal.

Figure 8:
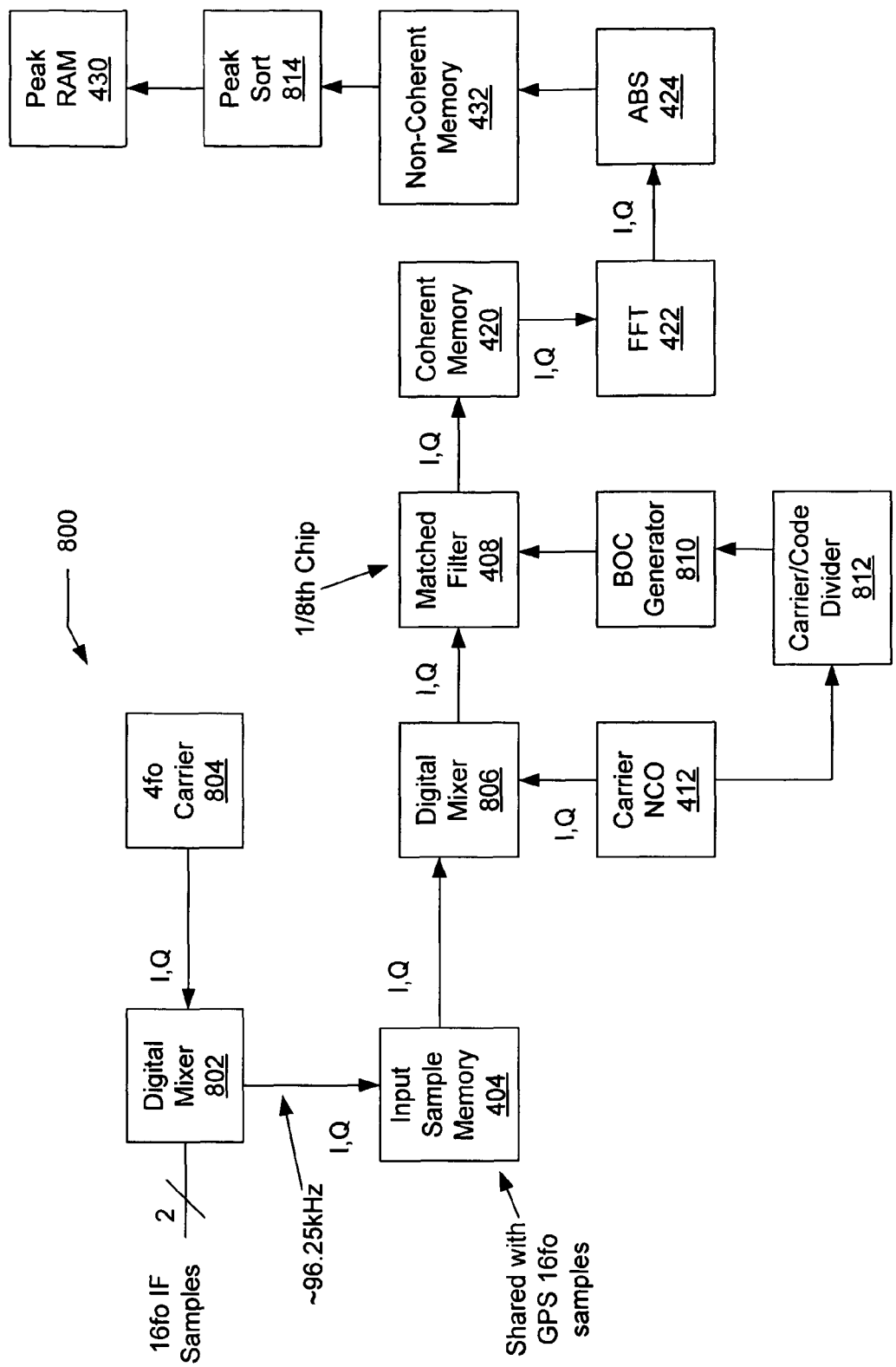
FIG. 8 is a block diagram that illustrates the Galileo mode of operation of the GGR of FIG. 1.

In FIG. 8, a block diagram 800 of an example of an implementation of a GGR 114 operating in the Galileo mode for tracking the BOC(1,1) signal in accordance with the invention is shown. Similar to the GPS mode, the Galileo mode receives the Galileo position signal at the GRR 114 and down converts it to an intermediate frequency. The intermediate frequency is sampled at a rate of 16fo IF samples. The 16fo IF samples are received at a digital mixer 802. The digital mixer 802, mixes the I and Q 4fo carrier signal from a 4-bit NCO 804 generated by the time/AGC 403 resulting in a frequency of ~96.25 kHz signal sample. The digitized I and Q signal sample from the digital mixer 802 may be stored in the input sample memory 404. The input sample memory 404 may be memory that is reconfigurable between GPS digitized I and Q signals and Galileo 16fo samples. In other implementations, the input sample memory 404 may be sufficiently large to hold both the GPS 16fo samples and Galileo 16fo samples.

For the example IF bandwidth of 6 MHz, the bandwidth is large enough to contain most of the energy from GPS and Galileo signals (See FIG. 6), therefore the 16fo IF samples contain both GPS and Galileo SVs. It is desirable to minimize the memory both signals so that they may share the same input sample memory. Thus, as long as GPS mode is storing 16fo samples (not decimated samples) and Galileo mode is storing 16fo samples (i.e. BOC mode and not side lobe modes) both signals may share the same input sample memory.

The digital 16fo samples in the input sample memory 404 may be accessed by digital mixer 806 that mixes the carrier generated by the NCO (numerical controlled oscillator) 412 with the digital 16fo samples. The output of the digital mixer 806 is processed by the matched filter 408. In the Galileo mode, the matched filter 808 is operating on ⅛th chip of signal data. Unlike in the GPS mode where a C/A generator may generate 1023 codes used in the ¼$^{th}$ chip configured match filter 808, a BOC Generator 810 generates a 4092 chip code used by the ⅛$^{th}$ chip configured match filter 808. The BOC Generator 810 may receive input from the carrier/code divider 812. The Carrier NCO 412 also provides a signal to the carrier/code divider 812.

The I and Q output of the match filter is stored in the coherent buffer (coherent memory) 420. The coherent memory 420 may be configured differently in the Galileo mode than in the GPS mode. More specifically coherent memory 420 may be increased in size to accommodate the output of the matched filter 808 when the GRR 114 is operating in Galileo mode. This increase in coherent memory size may be employed because the Galileo signal has a spreading code with 4092 chips, as opposed to GPS C/A with only 1023 chips.

The output of the coherent memory 420 is then processed by the FFT 422. The FFT 422 enables short coherent integrations and combines them. The absolute value or normalization of the output of the FFT 422 occurs in block 424. The normalized value from block 424 may be referred to as non-coherent data and is then stored in the non-coherent memory 432. The non-coherent memory may be larger in the GRR 114 to accommodate the additional data received from the Galileo signal. In other implementations, the non-coherent memory may be configured to store both GPS non-coherent data and Galileo non-coherent data. The peak sorting occurs 814 where the non-coherent data is sorted by sorter 426 and detection of peaks occurs with detector 428. The detected signals peaks are then stored in ram 430.

As described, a BOC(1,1) generator may be switched into the signal processing path to replace the traditional coder 412. The switching may occur with the use of multiplexer external to the match filter 408 or 808. In other implementations the multiplexer or switch may be integrated within the match filter 408 and 808. In yet other implementations the match filter 408 and 808 may be a common configurable match filter that is able ⅛$^{th}$ chip processing in addition to other size of chip processing.

Figure 9:
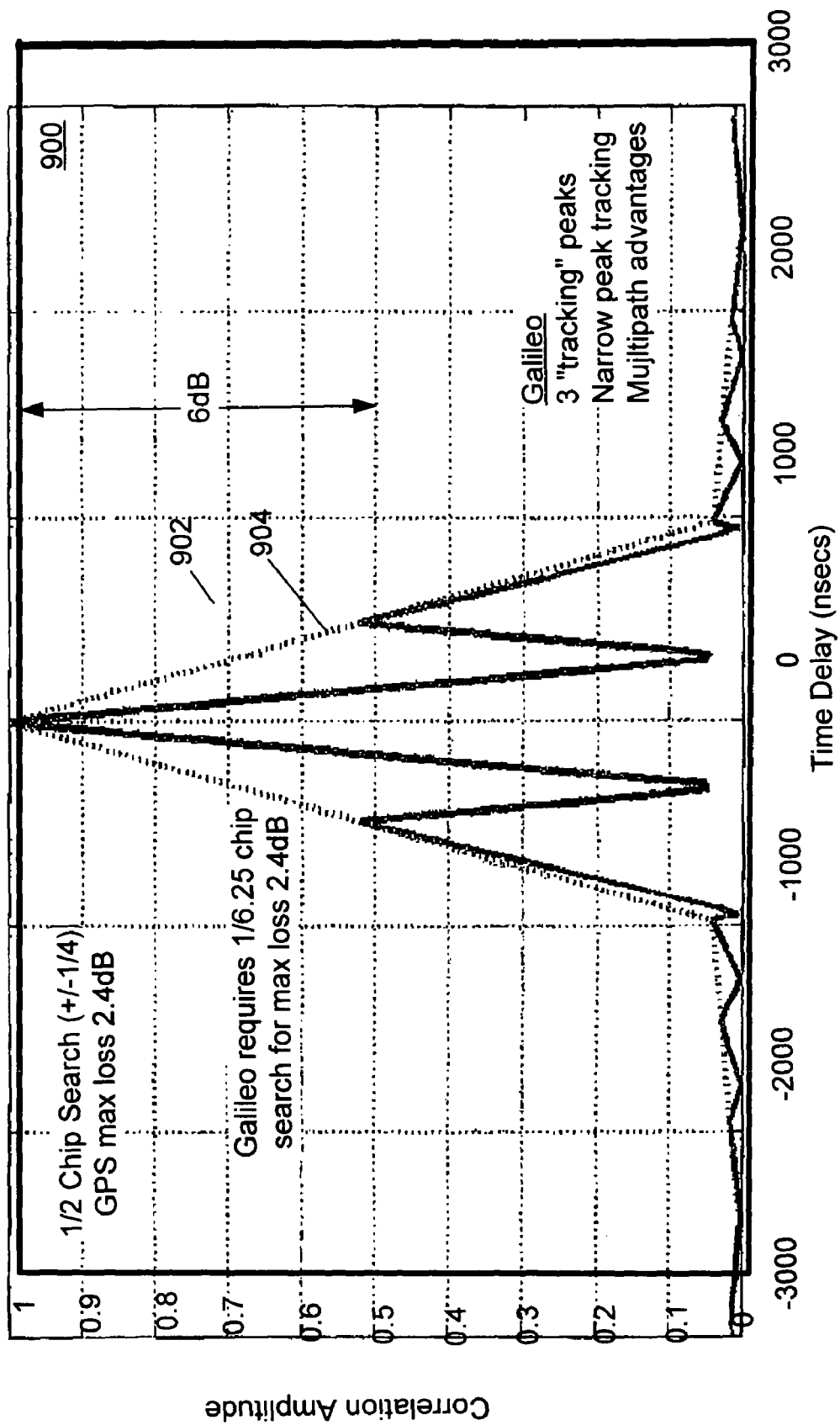
FIG. 9 is a graph that illustrates the absolute value correlation function of both BOC and GPS correlations.

Turning to FIG. 9, a graph 900 that illustrates the absolute value correlation function of both BOC and GPS correlations is shown. As described above, the absolute value correlation function is performed in block 424, FIG. 8. The GPS correlation 902, FIG. 9 may be ½ chip search (plus or minus ¼ chip) and results in a maximum loss of 2.4 dB. In order for Galileo correlation to achieve the same result a 1/6.25 chip search is required. The BOC(1,1) correlation 904 allows for tracking three peaks. An advantage of tracking the three narrow peaks is a reduction of correlation errors due to multipath interference. Another correlation check that may occur is verifying that the highest peak correlation amplitude is approximately 6 db above each of the other two peaks that may make up the Galileo correlation 904.

The GRR 114 operating in the Galileo mode functions differently when acquiring the SV signals as opposed to tracking SV signals. Turning to FIG. 10, a block diagram 800 of the GRR 114 of FIG. 4 with the GRR 114 operating in the Galileo mode attempting to acquire Galileo SV signals is shown. A downconverter intermediate frequency signal is sampled at 16fo. The resulting samples are mixed by a digital mixer 802 with 3fo or 5fo carrier from the 4-bit NCO 804 and results in ~96.25 kHz I and Q mixed signal.

The 4-bit NCO 804 may consist of a 4-bit adder and latch. The latch may be clocked at 16fo. On each 16fo clock the output of the latch is added to the carrier NCO frequency word. The frequency word takes on the value "0011" for 3fo operation and "0101" for 5fo operation, a difference of 2-bits between the two modes. The output of the latch may be further processed by a Phase Mapper that takes the "sawtooth" latch output and translates it into an estimate of a cosine wave (for in phase I). The Q signal is created with an additional step of adding "0100" to the latch output. "0100" represents a ninety degree phase shift for a 4-bit NCO. The Q output also uses a Phase Mapper.

The resulting mixed signal from the digital mixer 802 is decimated with a decimation filter 1002. In other implementations, other filters may be used to reduce the amount of data being processed and increase the time to acquisition. The decimation filter 1002 may be a 4fo decimation filter, but in other implementations a 2fo decimation filter may be employed with a resulting signal reduction (around 1.5 dB). The filtered data from the decimation filter 1002 is stored in the sample input memory 404. The filtered data must be stored separate from GPS 4fo samples, but optionally may be stored with 16fo samples. If the GPS mode samples are not 16fo then separate or partitioned input sample memory may be required. The stored filtered data or samples are then processed by another digital mixer 806, carrier NCO 412, matched filter 408 and carrier/code divider 812.

A difference between tracking and acquisition operation when the GRR 114 is in the Galileo mode, is that tracking operation uses a BOC(1,1) generator 810 and the acquisition operation employs a short code generator (or short +NH codes generator) 1004. The short code generator may be implemented as 25 bits in memory that are successively clocked out. The 25 bits are effectively data modulated onto the 4 msec length spreading code, so the 25-bit code causes the sequence to repeat every 100 msecs. The purpose is partly to provide a time-mark on the pilot channel. The output data from the matched filter 408 is then stored in the coherent memory 420. The output data is then processed by the FFT 422 and normalized in the ABS block 424. The resulting signal data is then stored in the non-coherent memory 432. The stored signal data in the non-coherent memory is then peak sorted by peak sorter 814 with the results placed in peak RAM 430.

The acquisition strategy that may be implemented in GGR 114 for acquisition of Galileo signals makes use of the same matched filter 408 and FFT 422 used to acquire GPS signals. If a small time window, such as less than or equal to one millisecond is desired, then a ⅛ chip search scheme is used with BOC correlation process of 16fo samples. Otherwise, if a large time window is employed (greater than one millisecond) then a ½ chip search scheme is used with the code correlation process along with creating a GPS-like correlation function. Each side lobe is independently isolated and correlated.

Acquisition may be initially focused on the Galileo pilot signal. But, once acquired, a transition from acquisition to tracking the signal from the SV occurs. This transition may employ a "bump and jump algorithm" with delay compensation. The "bump and jump algorithm" may occur in software with the data being processed at a 100 millisecond rate. Summations of the three different peaks occur and signal tracking occurs by locking onto the largest peak In FIG. 11, a block diagram 1100 that illustrates the combining Galileo signal side lobes when the GGR 114 is in the Galileo mode of operation and attempting to acquire a Galileo SV signal is shown. The intermediate frequency samples are digital mixed with 3fo and 5fo carriers and decimated by a decimation filter. The filtered signals are stored in a 3fo sample memory 1102 and 5fo sample memory 1104. The two sample memories may be implemented as a single sample memory with different areas to store the 3fo and 5fo filtered samples. The signals are passed through the digital mixer 806 and mixed with carrier generated by the carrier NCO 412. The carrier/code divider 812 also receives the carrier from the carrier NCO 412 and provides a divided signal for use by the code generator. The code generator 410 used in detecting Galileo signal side lobes is the same code generator used in the GPS mode of operation. The code generator generates the PN codes used by the matched filter 408 that is operating in a ½ chip configuration. The resulting I and Q data is stored in the coherent memory 420. The resulting data is then processed by the FFT 422 and normalized by the absolute value block 424. The results are then stored in the non-coherent memory 432. The combining of the side lobes effectively occurs in the non-coherent memory 432. The data contained in the non-coherent memory 432 is then peak sorted in block 814 and the resulting peak data stored in peak ram memory 430.

The correlation combinations for the Galileo signal in the GGR 114 may include one pilot side lobe, two pilot side lobes, data and pilot channels, one side lobe. For one pilot side lobe the acquisition would be $P_{Pilot\ 3fo} = I_{Pilot\ 3fo}^2 + Q_{Pilot\ 3fo}^2$. For two pilot side lobes the acquisition would be $P_{Pilot} = P_{Pilot\ 3fo} + P_{Pilot\ 5fo}$. For the data and pilot channels and one side lobe the acquisition would be P3fo=$(I_{Pilot\ 3fo} + I_{Data\ 3fo})^2 + (Q_{Pilot\ 3fo} + Q_{Data\ 3fo})^2$, P3fo=$(I_{Pilot\ 3fo} - I_{Data\ 3fo})^2 + (Q_{Pilot\ 3fo} - Q_{Data\ 3fo})^2$, with a maximum PDI of 4 milliseconds.

Figure 12:
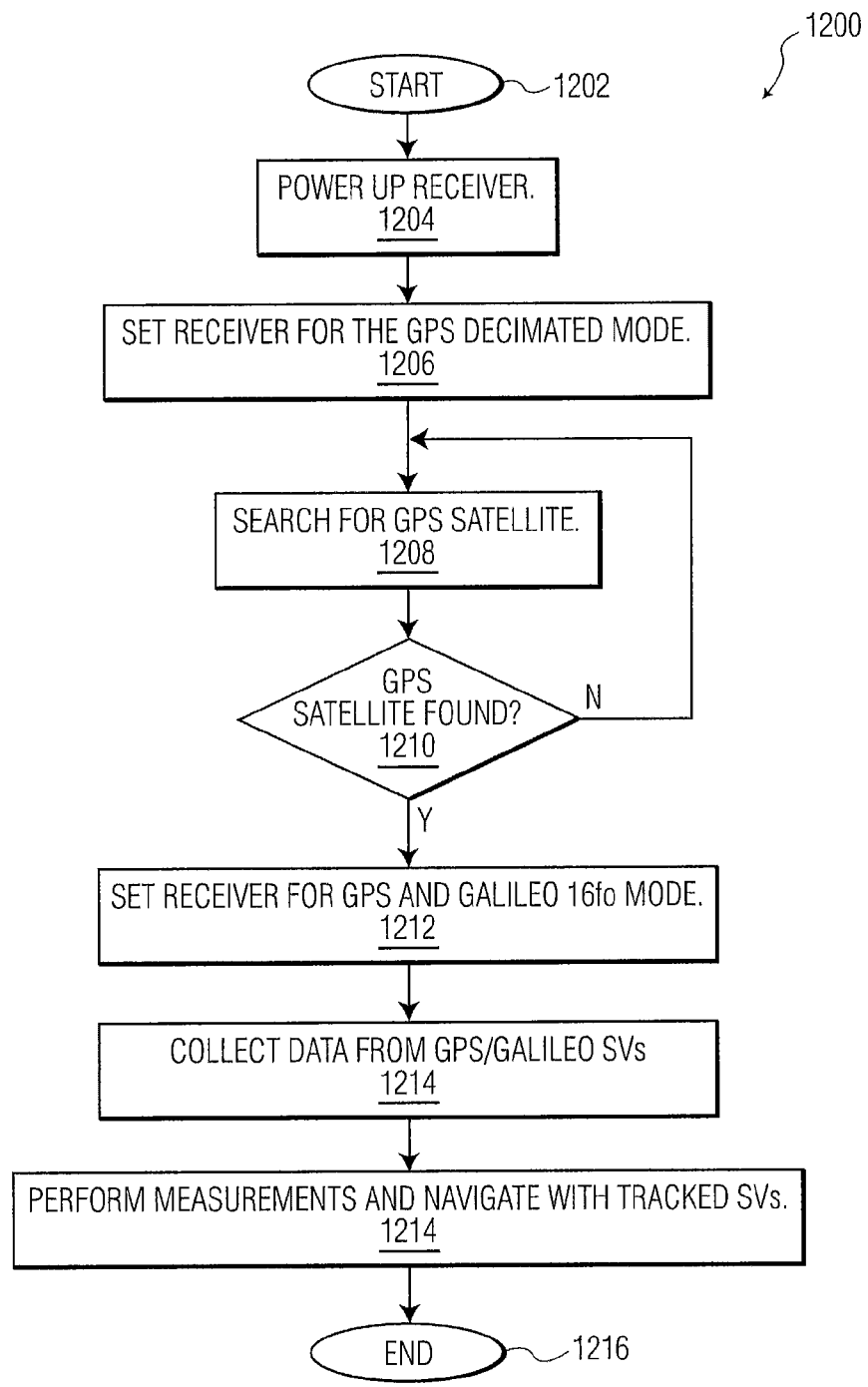
FIG. 12 is an illustration of a flow diagram of the operation of the GGR 114 of FIG. 4.

Turning to FIG. 12, an illustration of a flow diagram 1200 of the operation of the GGR 114 of FIG. 4 is shown. The flow diagram 1200 starts with step 1202 by powering up the GGR 114 in step 1204. After powering up the GGR 114 enters the GPS decimated mode, step 1206, with the input sample RAM configured for 4fo input samples. This mode is chosen for start up because the GPS system has less C/A chips to search and the receiver knowledge of time is 1 msec and with the memory and processing power used to search for only a GPS satellite, in step 1208, is more efficient then processing used to search for both a GPS SV and Galileo SV or just a Galileo SV. In other implementations, other modes or sub-modes may be entered prior to the GPS decimate mode, such as a self test mode.

If in step 1208 a GPS satellite is found, then the GGR 114 mode is changed or reconfigured to be in a GPS and Galileo 16fo mode in step 1212. Otherwise, step 1208 continues the search for a GPS satellite. When in the GPS and Galileo 16fo mode, the single input sample RAM for both GPS and Galileo signals is employed. The time (<<1 msec) and frequency uncertainties (<100 Hz) are significantly reduced via the first GPS SV acquisition and tracking. The additional search for all GPS and Galileo SVs occurs and data collected in step 1214 from the GPS/Galileo SVs. Once the data is collected that may also include ephemeris data, the GGR 114 may perform measurements and navigate with tracked SVs. In other implementations, the GGR 114 may communicate with a host processor that then uses the data to perform measurements and navigate.

It is further understood that the software being executed by a controller or microprocessor drives the receiver setup for the various operational modes and sub-modes. Many other modes of running the GGR 144 are possible, including if the receiver already has an accurate time (e.g. via network or TRC), that enables the GGR 114 to immediately to step 1214 of FIG. 12. In a jamming environment, multiple input sample RAMs may be set up in the process side lobe modes. In a high multipath environment, it may be preferable to use configure the GGR 114 to use Galileo SVs due to the Galileo's systems improved multipath performance in the BOC mode.

As described, the GRR 114 is able to operate in at least two modes that are dependent on the type of SV signals being acquired and tracked. It is understood that the GGR 114 may in other implementations be a tracker device that only acquires and tracks SV signals while a separate host processes the data. In yet other implementations, the GGR 114 may have two modes for acquisition and tracking and other sub-modes for different approaches for acquisition, such as stand-a-lone, network centric, network aided, WAAS aiding, and additional types of aiding that are known in the art at this time.

A network aided mode or sub-mode may provide ephemeris, almanac, approximate time (better than 2 seconds), and approximate position (better than 30 km). Although the GSM network aiding standard (called 3GPP) calls for support of both GPS and Galileo many carriers (phone companies) will only support a subset of messages, therefore a carrier may not support Galileo messages. Under these conditions the GPS/Galileo receiver will focus on acquiring/tracking GPS satellites on power up (in order to reduce the TTFF, time to first fix, which can be dominated by the time it takes to collect an ephemeris over the air). Network aiding is essentially instantaneous because it can be collect while the GPS receiver is off.

A cold start mode or sub-mode may occur when the receiver has no ephemeris or knowledge of current time. Ephemeris data is collected in order to do a position fix so the satellites must be relatively strong, for example greater than 26 dB-Hz. In this mode or sub-mode the receiver may be optimized by search type, for example to search for both GPS and Galileo satellites because this optimizes the chance of observing at least one SV >26 dB-Hz. The first SV observed is then used to narrow the code/carrier search window for all other SVs.

Another mode or sub-mode is a client based ephemeris start up. In a client based ephemeris, a device (without network support) may use old ephemeris (say up to 4 weeks old) to create a current ephemeris (not requiring ephemeris collection from the satellite, which can be impossible at very low CNOs, say <20 dB-Hz). In this mode or sub-mode Galileo satellite tracking and position fixing is preferred because the Galileo satellites will carry Hydrogen Maser clocks that are 10 times more stable than GPS cesium clocks. The satellite clock term contributes most of the error when computing client based ephemeris across significant timeframes (more than a few days).

While various embodiments of the invention have been described, it will be apparent to those of ordinary skill in the art that many more embodiments and implementations are possible within the scope of this invention. Moreover, it will be understood that the foregoing description of numerous implementations has been presented for purposes of illustration and description. It is not exhaustive and does not limit the claimed inventions to the precise forms disclosed. Modifications and variations are possible in light of the above description or may be acquired from practicing the invention. The claims and their equivalents define the scope of the invention. Accordingly, the invention is not to be restricted except in light of the attached claims and their equivalents.

What is claimed is:

1. A global positioning system (GPS) and Galileo system device, comprising:
   an input sample memory for receipt of 4fo digital signal samples of a positioning signal in a first mode or 16fo digital signal samples from a digital mixer in a second mode;
   a carrier generator for generation a 1023 chip spreading code when 4fo digital signal samples of a GPS signals are received and 4092 chip spreading code when 16fo digital signal samples of a Galileo signal are received;
   a match filter configurable for at least a ½ chip and ¼ chip match filter that match the spreading code with the digital samples from the digital sample memory;
   a coherent memory to store the filtered data from the match filter;
   a non-coherent memory for storage of non-coherent data that results from application of a fast Fourier transform to the filtered data; and
   a peak detector that detects data peaks by sorting the non-coherent data in the non-coherent memory and storing the detected peaks in a peak memory, where the peaks indicate the presence of a signal from a satellite vehicle.

2. The GPS and Galileo system device of claim 1, further comprising a binary offset carrier (BOC) signal as the positioning signal received at the digital mixer when the device is in the second mode.

3. The GPS and Galileo system device of claim 2, where the match filter as a ¼ chip match filter.

4. The GPS and Galileo system device of claim 2, where the coherent memory is larger in the second mode relative to the first mode.

5. The GPS and Galileo system device of claim 2, where the non-coherent memory is larger in the second mode relative to the first mode.

6. The GPS and Galileo system device of claim 2, where the satellite vehicle is a Galileo satellite.

7. The GPS and Galileo system device of claim 2, including:
   a 3fo carrier mixed with the 16fo digital samples by the digital mixer resulting in a digital samples that are stored in the input sample memory;
   a short code generator that generates a portion of a spreading code that is used by the ½ chip match filter to generate filtered data that is stored in the coherent memory during acquisition of a side lobe of a Galileo positioning signal.

8. The GPS and Galileo system device of claim 7, further including a 5fo carrier mixed with the 16fo digital samples by the digital mixer resulting both digital samples stored in a 3fo input sample memory and a 5fo input sample memory that is further processed by the matched filter resulting in filtered data stored in the coherent memory during acquisition of both side lobes of a Galileo position signal.

9. The GPS and Galileo system device of claim 2, including:
   a 5fo carrier mixed with the 16fo digital samples by the digital mixer resulting in a digital samples that are stored in the input sample memory;
   a short code generator that generates a portion of a spreading code that is used by the ½ chip match filter to generate filtered data that is stored in the coherent memory during acquisition of a side lobe of a Galileo positioning signal.

10. The GPS and Galileo system device of claim 9, further including a 3fo carrier mixed with the 16fo digital samples by the digital mixer resulting both digital samples stored in a 3fo input sample memory and a 5fo input sample memory that is further processed by the matched filter resulting in filtered data stored in the coherent memory during acquisition of both side lobes of a Galileo position signal.

11. The GPS and Galileo system device of claim 1, further including,
   a start mode with the input sample memory adapted to store input samples from a GPS positioning signal that are processed by the match filter that employs a GPS dispreading code in determining if a GPS satellite vehicle has been acquired and the match filter being configured to process input samples from a BOC signal in response to acquisition of the GPS satellite.

* * * * *